(12) United States Patent
Kim et al.

(10) Patent No.: US 12,468,487 B2
(45) Date of Patent: Nov. 11, 2025

(54) STORAGE DEVICE FOR REDUCING OR PREVENTING SUCCESSFUL ATTACKS BY MALICIOUS USERS AND OPERATING METHOD THEREOF

(71) Applicant: Samsung Electronics Co., Ltd., Suwon-si (KR)

(72) Inventors: Hyungseuk Kim, Seongnam-si (KR); Myunghoon Choi, Suwon-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 491 days.

(21) Appl. No.: 17/958,811

(22) Filed: Oct. 3, 2022

(65) Prior Publication Data

US 2023/0131062 A1 Apr. 27, 2023

(30) Foreign Application Priority Data

Oct. 25, 2021 (KR) .................. 10-2021-0143075

(51) Int. Cl.
*G06F 3/06* (2006.01)
*G06F 21/45* (2013.01)
*G06F 21/79* (2013.01)

(52) U.S. Cl.
CPC .......... *G06F 3/0679* (2013.01); *G06F 3/0604* (2013.01); *G06F 3/0659* (2013.01); *G06F 21/45* (2013.01); *G06F 21/79* (2013.01)

(58) Field of Classification Search
CPC .... G06F 3/0679; G06F 3/0604; G06F 3/0659; G06F 3/0622; G06F 21/45; G06F 21/79; G06F 21/78; G06F 21/33; G06F 21/64; G06F 21/44; G06F 21/602; G06F 2221/2103; G06F 12/1466; G06F 12/1483; H04L 63/0823; H04L 9/3247; H04L 9/326
See application file for complete search history.

(56) References Cited

U.S. PATENT DOCUMENTS

| | | |
|---|---|---|
| 6,687,835 B1 | 2/2004 | Hirano et al. |
| 7,634,629 B2 | 12/2009 | Nemiroff et al. |
| 8,032,761 B2 | 10/2011 | Rodgers et al. |
| 8,245,000 B2 | 8/2012 | Ramezani |
| 8,544,065 B2 | 9/2013 | Archer et al. |

(Continued)

FOREIGN PATENT DOCUMENTS

| | | |
|---|---|---|
| KR | 10-2010-0112119 A | 10/2010 |
| KR | 10-2015-0139420 A | 12/2015 |
| KR | 20150139420 A * | 12/2015 |

OTHER PUBLICATIONS

NVMe Specifications 2.0, NVM Express® Base Specification, Revision 2.0a, *NVS Express Workgroup*, Jul. 23, 2021, pp. 1-442.

(Continued)

*Primary Examiner* — Han Yang
(74) *Attorney, Agent, or Firm* — Harness, Dickey & Pierce, P.L.C.

(57) ABSTRACT

Provided are a storage device and an operating method thereof. The storage device includes: a memory storing parameter data that is used as an input in a neural network; and a storage controller configured to receive a request signal from a host, encode log data for contexts of a plurality of components in the neural network, based on the parameter data, and transmit the encoded log data to the host.

21 Claims, 23 Drawing Sheets

(56) References Cited

U.S. PATENT DOCUMENTS

| | | |
|---|---|---|
| 10,866,747 B2 | 12/2020 | Som et al. |
| 10,909,238 B2 | 2/2021 | Kwon et al. |
| 2004/0068631 A1 | 4/2004 | Ukeda et al. |
| 2013/0179993 A1* | 7/2013 | Sandler .................. G06F 21/60 |
| | | 726/30 |
| 2017/0338887 A1* | 11/2017 | Rao ..................... H04J 14/0293 |
| 2018/0024778 A1 | 1/2018 | Singh et al. |
| 2018/0198616 A1* | 7/2018 | Feather ................ H04L 9/3273 |
| 2019/0294765 A1 | 9/2019 | Fine et al. |
| 2020/0310678 A1 | 10/2020 | Boyle |
| 2023/0179418 A1* | 6/2023 | Noh ...................... H04L 9/0861 |
| | | 713/168 |
| 2025/0028864 A1* | 1/2025 | Lee ........................ G06F 21/64 |

OTHER PUBLICATIONS

Extended European Search Report dated Oct. 28, 2022 for corresponding European Application No. 22176646.2.

\* cited by examiner

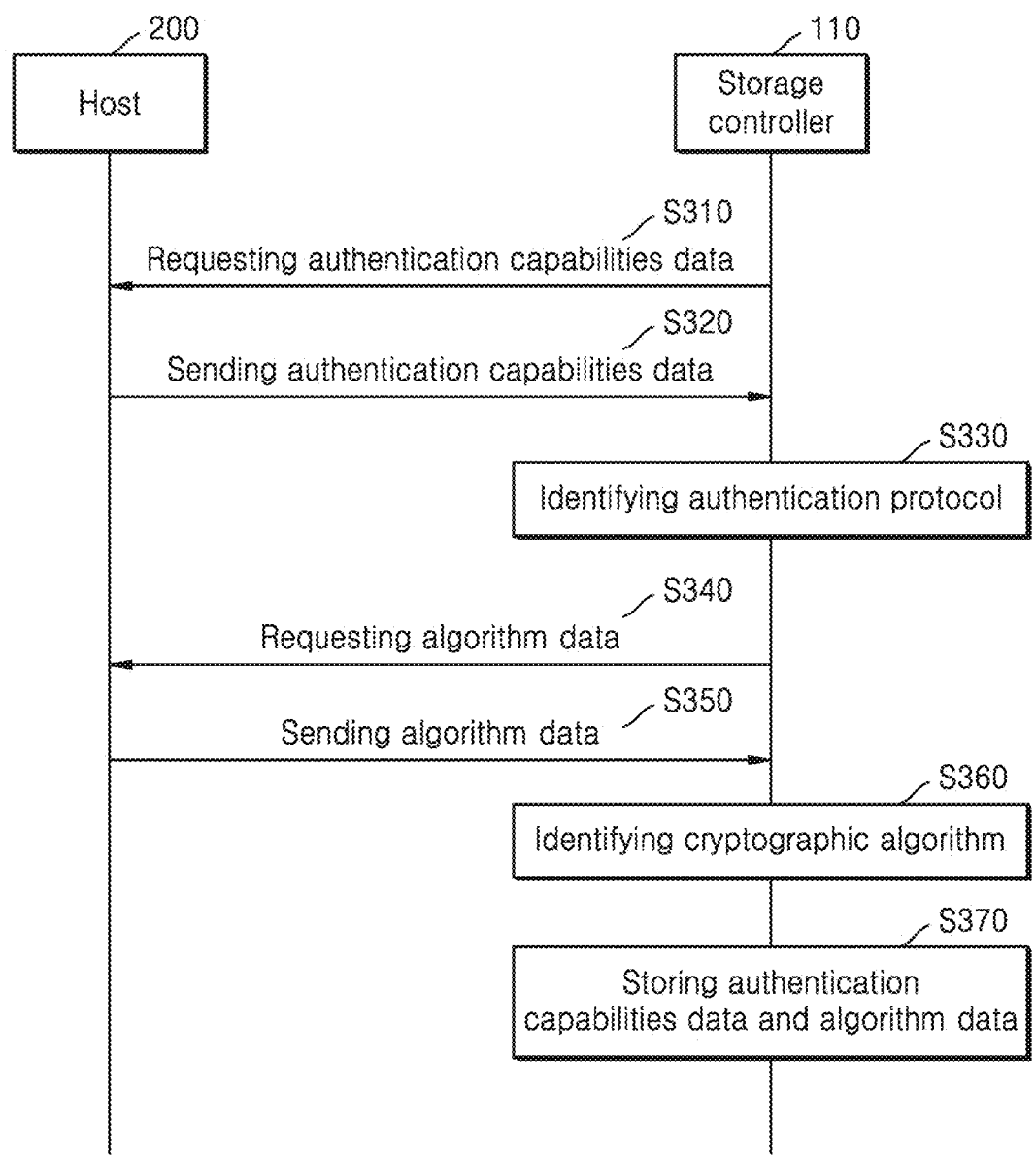

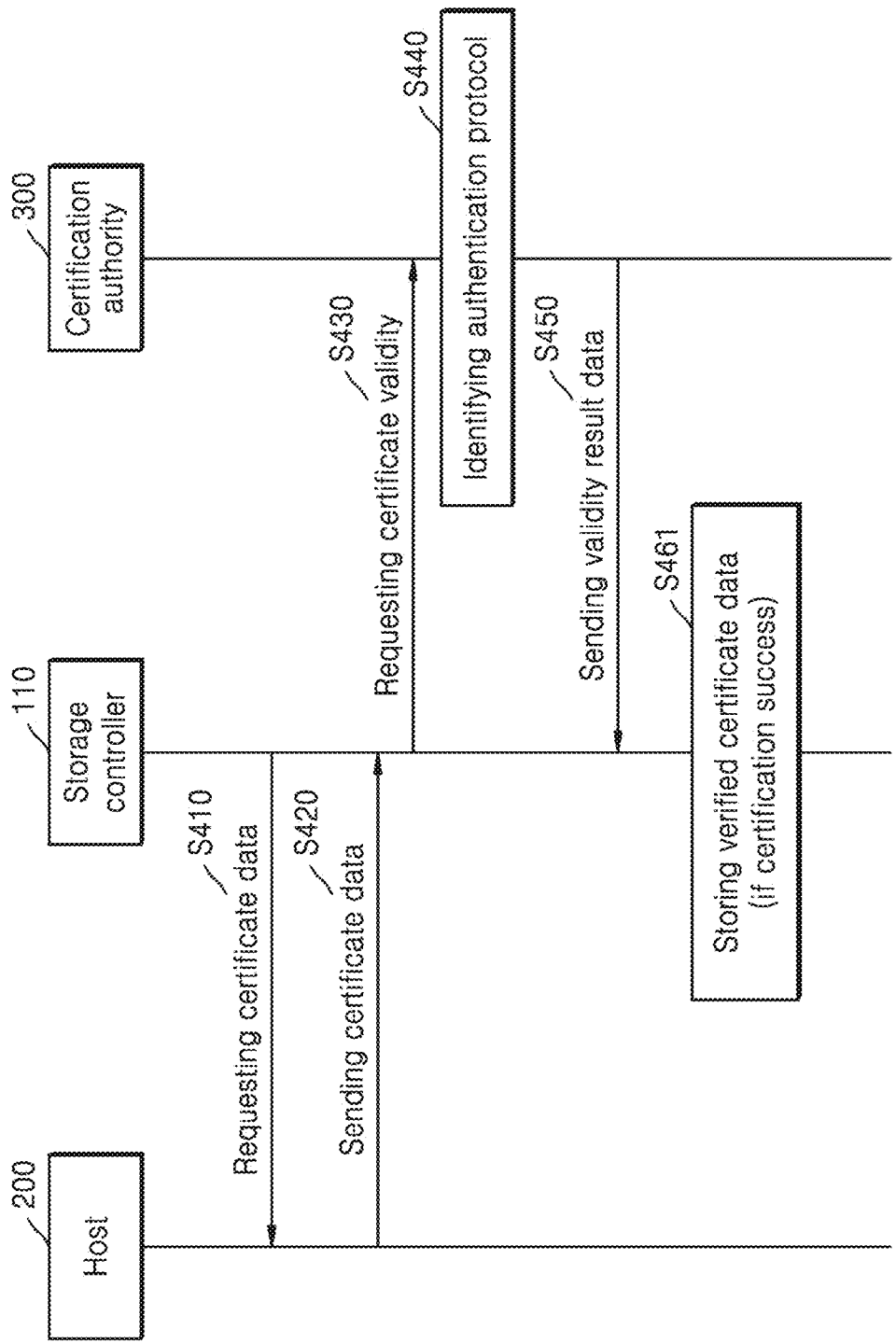

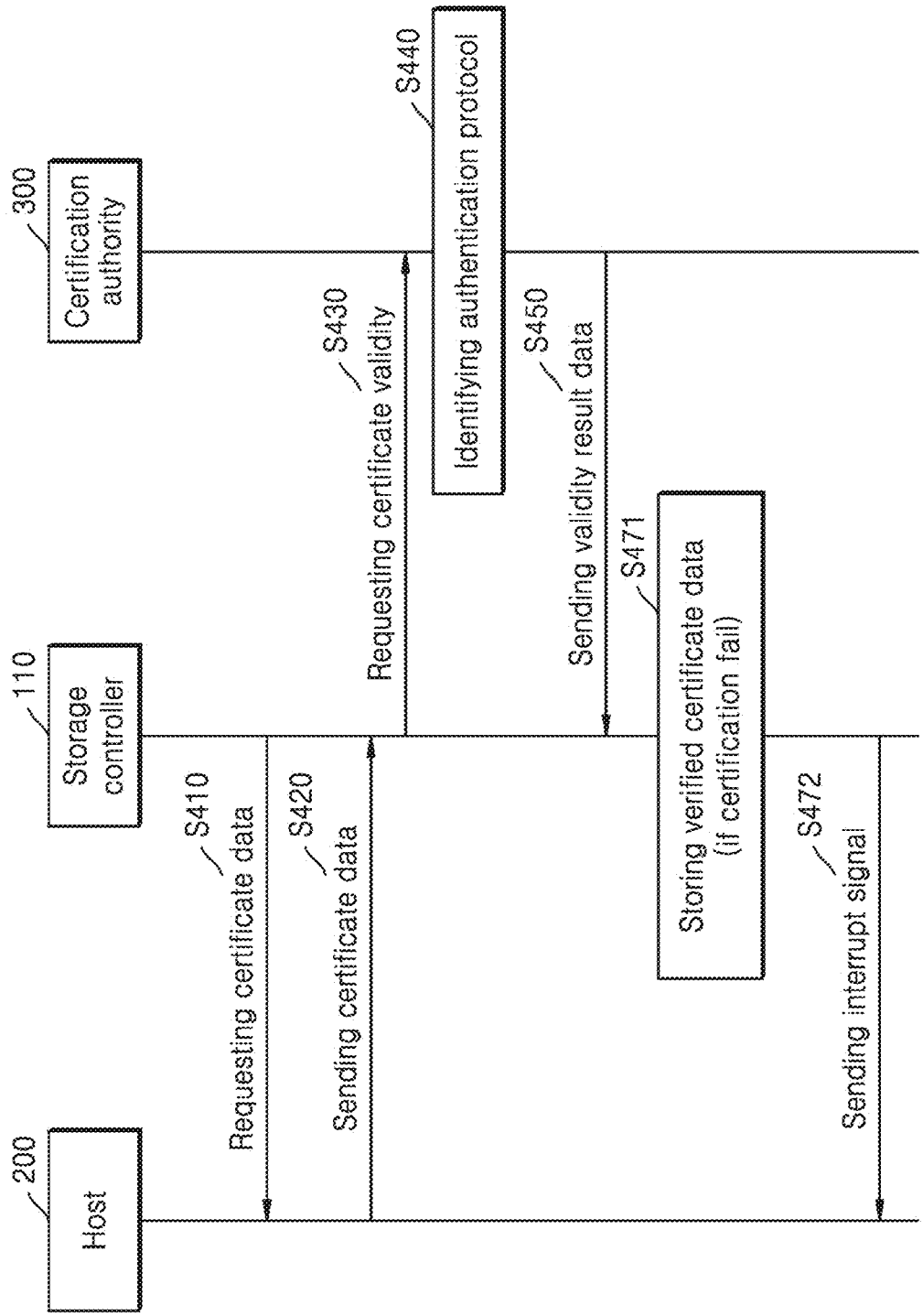

STORAGE DEVICE FOR REDUCING OR PREVENTING SUCCESSFUL ATTACKS BY MALICIOUS USERS AND OPERATING METHOD THEREOF

CROSS-REFERENCE TO RELATED APPLICATION

This application is based on and claims priority under 35 U.S.C. § 119 to Korean Patent Application No. 10-2021-0143075, filed on Oct. 25, 2021, in the Korean Intellectual Property Office, the disclosure of which is incorporated by reference herein in its entirety.

BACKGROUND

The inventive concepts relate to an electronic device, and more particularly, to a storage device and an operating method thereof.

Representative examples of flash memory-based mass storage devices include solid state drives (SSDs). Along with an explosive increase of SSDs, purposes thereof have been diversified. SSDs may be managed and maintained to provide high reliability and optimal service quality.

Malicious users may attack SSDs. For example, unauthenticated hosts may transmit administration commands to SSDs, and the SSDs may abnormally perform operations directed by the administration commands. Accordingly, there is an issue of a reduction in the reliability of SSDs. Therefore, research for protecting SSDs from malicious users have been actively carried out.

SUMMARY

The inventive concepts provide a storage device for reducing or preventing successful attacks by malicious users and a method of operating the storage device.

According to some example embodiments of the inventive concepts, there is provided a storage device capable of communicating with a host, the storage device including: a first memory storing command list data indicating list information for at least one administration command; and a storage controller configured to: receive a first command from the host; check whether the first command corresponds to an administration command of the list information, based on the command list data; and transmit, to the host, a first response signal for requesting authentication according to a check result.

According to some example embodiments of the inventive concepts, there is provided a storage device having a first channel and a second channel, the storage device including: a first memory storing command list data that includes information indicating an administration command; and a storage controller configured to: receive the administration command from a host through the first channel; transmit a response signal to the host through the first channel; and transmit and receive an authentication signal for authenticating the host through the second channel.

According to some example embodiments of the inventive concepts, there is provided a method of operating a storage device capable of communicating with a host, the method including: receiving a command from the host; transmitting a response signal for requesting authentication for the host, according to whether the command corresponds to at least one command included in a prestored command list; performing an authentication operation, based on authentication data transmitted from the host; and performing an operation corresponding to the command, according to a result of the authentication operation.

BRIEF DESCRIPTION OF THE DRAWINGS

Some example embodiments of the inventive concepts will be more clearly understood from the following detailed description taken in conjunction with the accompanying drawings in which:

FIG. 4 is a diagram specifically illustrating discovering and negotiating an authentication capability, shown in FIG. 3;

FIGS. 5A and 5B are each a diagram specifically illustrating retrieving a certificate, shown in FIG. 3;

DETAILED DESCRIPTION

Hereinafter, some example embodiments of the inventive concepts will be described in detail with reference to the accompanying drawings.

Figure 1:
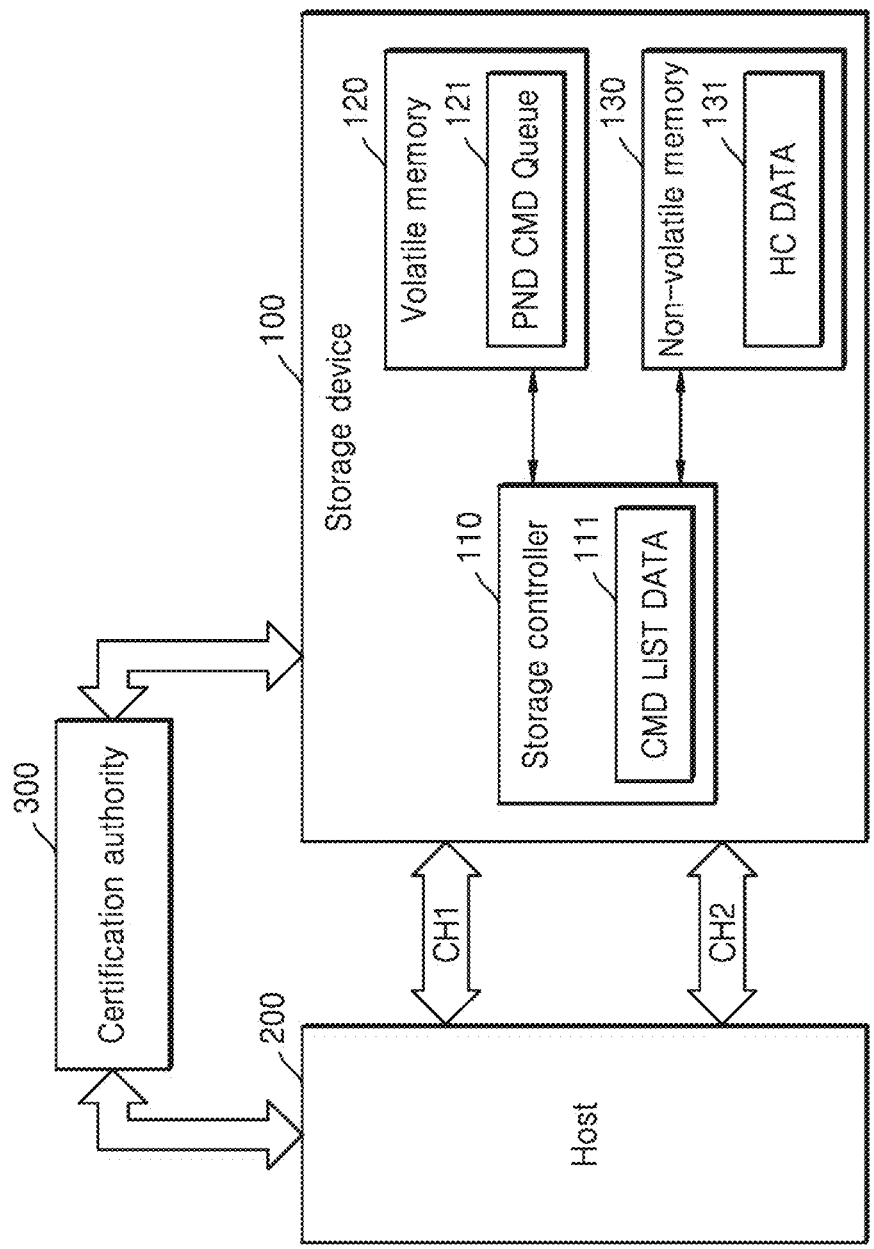
FIG. 1 is a diagram illustrating a storage system according to some example embodiments of the inventive concepts.

FIG. 1 is a diagram illustrating a storage system according to some example embodiments of the inventive concepts.

Referring to FIG. 1, the storage system according to some example embodiments of the inventive concepts may include a storage device 100, a host 200, and/or a certification authority 300.

The storage device 100 may include a plurality of components. A component may be implemented in the form of hardware, software, or hardware and software, in the storage device 100. Herein, the component may be referred to as an element. Referring to FIG. 1, for example, the storage device 100 may include a storage controller 110, a volatile memory 120, and/or a non-volatile memory 130. However, the inventive concepts are not limited thereto.

The storage device 100 may include storage media for storing data according to a request from the host 200. For example, the storage device 100 may include at least one of a solid state drive (SSD), embedded memory, and/or removable external memory. When the storage device 100 is an SSD, the storage device 100 may conform to non-volatile memory express (NVMe) specifications. When the storage device 100 is embedded memory or external memory, the storage device 100 may conform to universal flash storage (UFS) or embedded multimedia card (eMMC) specifications. Each, or one or more, of the host 200 and the storage device 100 may generate and transmit a packet, according to an employed standard protocol.

The storage device 100 may have a first channel CH1 and/or a second channel CH2. The first channel CH1 may be a channel implemented such that a command and/or a response signal with respect to the command are transmitted and/or received. The second channel CH2 may be a channel implemented such that an authentication signal between the storage device 100 and the host 200 is transmitted and received. In some example embodiments, the first channel CH1 may be an in-band channel, and the second channel CH2 may be an out-of-band channel. However, the inventive concepts are not limited thereto. The first channel CH1 may be implemented by Advanced Technology Attachment (ATA), Serial ATA (SATA), external SATA (e-SATA), and/or PCI express (PCIe), and the second channel CH2 may be implemented by System Management Bus (SMB), Inter-Integrated Circuit (I2C), and/or PCIe. However, the inventive concepts are not limited thereto. The authentication signal may be, for example, a signal for requesting hash data, authentication capability data, algorithm data, authentication data, and/or data required, or sufficient, for authentication. According to the above descriptions, the storage device 100 may have two or more channels, and thus, a communication operation for transmitting and receiving a command and/or a response signal may be performed in parallel with a communication operation for transmitting and/or receiving an authentication signal. Accordingly, an authentication operation through the second channel CH2 may be performed in parallel with an operation of transmitting and/or receiving the command and/or the response signal.

The storage controller 110 may control overall operations of the storage device 100. Herein, the storage controller 110 may be referred to as a controller, a device controller, and/or a memory controller.

When power is applied to the storage device 100 from outside thereof, the storage controller 110 may execute firmware. When the non-volatile memory 130 is a flash memory device, the firmware may include a host interface layer (HIL), a flash translation layer (FTL), and/or a flash interface layer (FIL).

The storage controller 110 may control the volatile memory 120 and/or the non-volatile memory 130 to respectively perform a program operation (or write operation), a read operation, and/or an erase operation in response to a write request, a read request, and/or an erase request from the host 200.

During the program operation, the storage controller 110 may provide a program command, a physical address, and/or write-data to the non-volatile memory 130. During the read operation, the storage controller 110 may provide a read command and/or a physical address to the non-volatile memory 130. During the erase operation, the storage controller 110 may provide an erase command and/or a physical address to the non-volatile memory 130.

The storage controller 110 may generate a command, an address, and/or data by itself, and transmit the command, the address, and/or the data to the non-volatile memory 130, regardless of a request from the host 200. For example, the storage controller 110 may generate a command, an address, and/or data for performing a background operation and may provide the command, the address, and the data to the non-volatile memory 130. The background operation may include, for example, wear leveling, read reclaim, and/or garbage collection.

The storage controller 110 may receive an administration command (admin command) from the host 200 through the first channel CH1. The admin command may be a command for directing to control an operation of the storage device 100. For example, the admin command may include a command for directing to create and/or delete a command queue, a command for directing to download a firmware image, a command for requesting an asynchronous event, a command for locking an operation regarding a specific admin command, and/or a command for controlling a sanitize operation. However, the inventive concepts are not limited thereto. The command for requesting an asynchronous event may be referred to as an asynchronous event request command. The command for locking an operation regarding a specific admin command may be referred to as a lockdown command. The command for controlling a sanitize operation may be referred to as a sanitize command. The admin command is defined in NVMe specifications (for example, NVMe 2.0a).

The storage controller 110 may store command list data 111 in advance. The command list data 111 may be data indicating list information for at least one admin command. According to some example embodiments, it is possible to reduce or prevent malware from successfully attacking the storage device 100 by transmitting a specific admin command such as a sanitize command. When an authentication-completed host provides an admin command included in the list information to the storage controller 110, the storage controller 110 may perform an operation corresponding to the admin command. The command list data 111 may be stored in read-only memory. Although the read-only memory may be included inside the storage controller 110, the inventive concepts are not limited thereto, and the read-only memory may be implemented outside the storage controller 110.

The storage controller 110 may transmit a response signal with respect to the admin command through the first channel CH1. In some example embodiments, the response signal may include content for requesting authentication of the host 200 that has transmitted the admin command. Here, the content for requesting the authentication may be expressed as a certain bit value in a specific field of the response signal.

The storage controller 110 may transmit an authentication signal for performing authentication on the host 200 through the second channel CH2.

In some example embodiments, the storage controller 110 may receive a first command from the host 200. The first command may be one of a plurality of admin commands or one of a plurality of input-output commands. However, the inventive concepts are not limited thereto. The storage controller 110 may check whether the first command corresponds to an admin command of the list information, based on the command list data 111 stored in advance. In addition, the storage controller 110 may transmit, to the host 200, a first response signal for requesting authentication, according to a check result. For example, when the first command corresponds to an admin command of the list information, the storage controller 110 may transmit the first response signal to the host 200.

In some example embodiments, the storage controller 110 may receive an admin command from the host 200 through the first channel CH1, may transmit a response signal with respect to the admin command through the first channel CH1, and/or may transmit and receive an authentication signal for the host 200 through the second channel CH2. Here, the admin command may be, for example, a lockdown command and/or a sanitize command, which is defined in the NVMe specifications (for example, sections 5.19 and 5.24 in NVMe 2.0a). However, the inventive concepts are not limited thereto.

The volatile memory 120 may be operated in response to control by the storage controller 110 only while power is supplied to the volatile memory 120. The volatile memory 120 may temporarily store data provided by the host 200 and/or data provided by the non-volatile memory 130 only while power is supplied to the volatile memory 120. The volatile memory 120 may be included as a buffer memory in the storage controller 110 or may be arranged outside the storage controller 110. For example, volatile memory devices may include dynamic random access memory (DRAM), static RAM (SRAM), and/or the like.

In some example embodiments, the volatile memory 120 may include a pending command queue 121. The pending command queue 121 may temporarily store a command, for which an operation is to be pending, from among commands provided by the host 200. Specifically, when a specific command provided by the host 200 corresponds to an admin command included in the list information of the command list data 111, the storage controller 110 may pend an operation corresponding to the specific command by temporarily storing the specific command in the pending command queue 121. The pending command queue 121 may be implemented separately from an input-output command queue and an admin command queue and may be implemented in a secure domain of the volatile memory 120. The pending command queue 121 may be implemented by SRAM. However, the inventive concepts are not limited thereto.

The non-volatile memory 130 may be operated in response to control by the storage controller 110. Specifically, the non-volatile memory 130 may receive a command and an address from the storage controller 110 and may access a memory cell selected by the address from among memory cells (not shown). The non-volatile memory 130 may perform an operation, which is directed by the command, on the memory cell selected by the address.

In some example embodiments, the command may be, as an input-output command, a program command, a read command, and/or an erase command, and the operation directed by the command (or the operation corresponding to the command) may be, for example, a program operation (or write operation), a read operation, and/or an erase operation. The program operation may be an operation, performed by the non-volatile memory 130, of storing data provided by the host 200, in response to control by the storage controller 110. The read operation may be an operation, performed by the non-volatile memory 130, of reading read-data stored in the non-volatile memory 130, in response to control by the storage controller 110. The erase operation may be an operation, performed by the non-volatile memory 130, of erasing data stored in a memory device, in response to control by the storage controller 110.

In some example embodiments, the command may be, as an admin command, a lockdown command and/or a sanitize command, and the operation directed by the command may be, for example, a lockdown operation and/or a sanitize operation. For example, by setting a bit value, which is located in a specific field of the lockdown command, to a first bit value, the lockdown operation may be performed. Alternatively, by setting a bit value, which is located in a specific field of the lockdown command, to a second bit value that is different from the first bit value set forth above, the lockdown operation may be released. Descriptions of the lockdown command will be made below with reference to FIG. 13.

According to some example embodiments, the non-volatile memory 130 may be implemented by a plurality of memory chips or a plurality of memory dies. For example, each, or one or more, of the plurality of memory chips may include a Dual Die Package (DDP), a Quadruple Die Package (QDP), and/or an Octuple Die Package (ODP).

For example, the non-volatile memory 130 may be, for example, flash memory. The flash memory may include, for example, NAND flash memory, NOR flash memory, and/or the like. When the non-volatile memory 130 includes flash memory, the flash memory may include a 2-dimensional (2D) memory array or a 3D (or vertical) NAND (VNAND) memory array.

As another example, the storage device 100 may include other various types of non-volatile memory. For example, magnetic RAM (MRAM), spin-transfer torque MRAM, conductive bridging RAM (CBRAM), ferroelectric RAM (FeRAM), phase-change RAM (PRAM), resistive RAM, and/or other various types of memory may be applied to the storage device 100.

In some example embodiments, the non-volatile memory 130 may store host characteristic data 131. The host characteristic data 131 may be data indicating information about characteristics of the host 200 that communicates with the storage device 100. The information about the characteristics of the host 200 may include, for example, identifier information, authentication protocol information, and/or the like.

The storage device 100 may perform wired communication and/or wireless communication with the certification authority 300. The storage device 100 may request authentication of a certificate of the host 200 by transmitting certificate data provided by the host 200 to the certification authority 300. The certificate of the host 200 may form a chain structure up to a root certificate, which is managed by the certification authority 300, through signature.

The host 200 may transmit a command to perform a specific operation to the storage device 100 and may receive a response signal with respect to the command from the storage device 100. To this end, the host 200 may include a submission queue, in which a command to be provided to the storage device 100 is temporarily stored, and a completion queue, in which a response signal to be provided by the storage device 100 is temporarily stored.

The certification authority 300 may perform an authentication operation on the certificate of the host 200, based on the certificate data, in response to the request from the storage device 100. In addition, the certification authority 300 may transmit verification result data, which indicates a result of the authentication operation, to the storage device 100.

The data, command, or signal transmitted between the storage device 100, the host 200, and/or the certification authority 300 may be transferred in the form of a message. However, the inventive concepts are not limited thereto.

Figure 2:
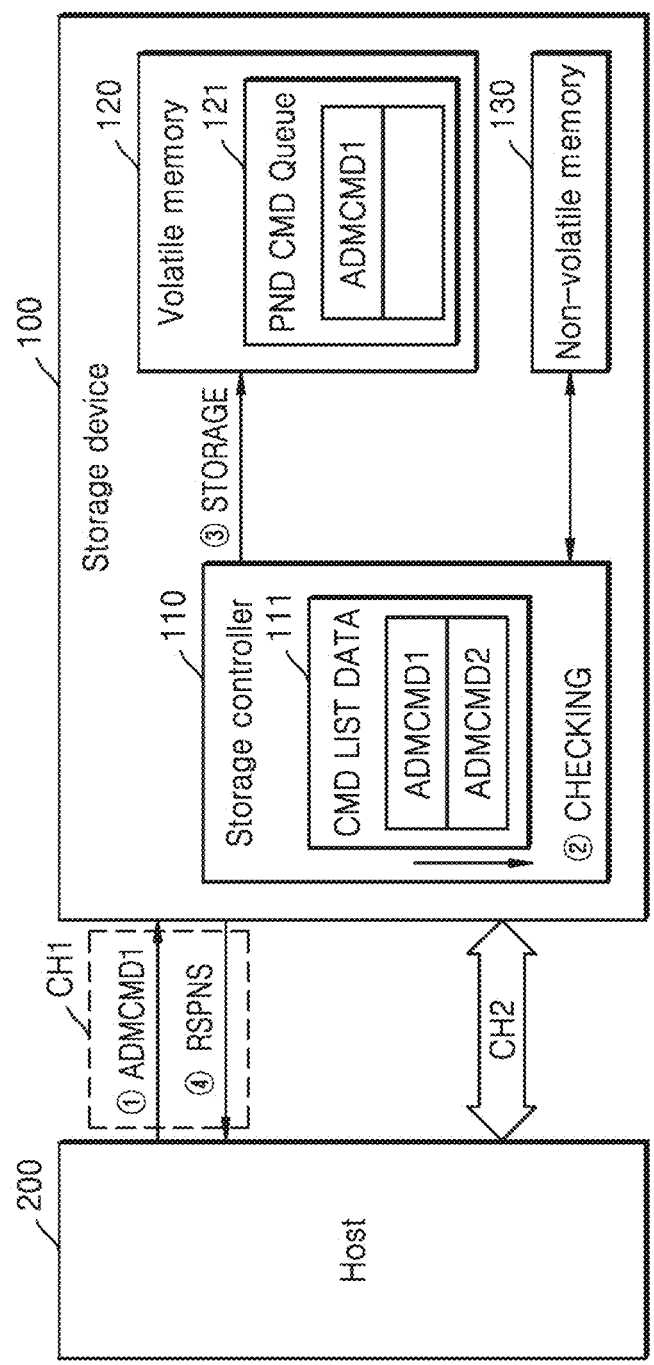
FIG. 2 is a diagram illustrating an operation, performed by a storage controller, of responding to an administration command, according to some example embodiments of the inventive concepts.

FIG. 2 is a diagram illustrating an operation, performed by a storage controller, of responding to an admin command, according to some example embodiments of the inventive concepts.

Referring to FIG. 2, the storage controller 110 may store the command list data 111 in advance. Here, it is assumed that the list information of the command list data 111 includes a first admin command ADMCMD1 and a second admin command ADMCMD2.

The host 200 may transmit the first admin command ADMCMD1 to the storage device 100 through the first channel CH1. The storage controller 110 may receive the first admin command ADMCMD1.

The storage controller 110 may request authentication or transmit a response signal RSPNS indicating the completion of an operation regarding an admin command, according to whether the received command corresponds to a command included in the command list stored in advance.

Specifically, for example, the storage controller 110 may retrieve an admin command, which is the same as the received first admin command ADMCMD1, from a list of a plurality of admin commands in the list information of the command list data 111.

Because the received first admin command ADMCMD1 is included in the list information of the command list data 111, the storage controller 110 may transmit data indicating the first admin command ADMCMD1, a write command, and/or an address to the volatile memory 120. By storing the first admin command ADMCMD1 in the pending command queue 121 included in the volatile memory 120, an operation directed by the first admin command ADMCMD1 (or an operation corresponding to the first admin command ADMCMD1) may be pending before the authentication operation on the host 200 is performed.

When the first admin command ADMCMD1 is stored in the pending command queue 121, the storage controller 110 may transmit the response signal RSPNS, which includes information requesting the authentication, to the host 200 through the first channel CH1.

In some example embodiments, the response signal RSPNS may further include a nonce. The nonce may be an arbitrary number capable of being used only once in cryptographic communication. In some example embodiments, the host 200 may calculate a signature by using the nonce included in the response signal RSPNS.

In some example embodiments, the host 200 may provide, to the storage device 100, an admin command (for example, a third admin command that is different from the first admin command ADMCMD1 and the second admin command ADMCMD2) which is not included in the list information of the command list data 111. In this case, the storage controller 110 may perform an operation corresponding to the received admin command and may transmit the response signal RSPNS with respect to the received admin command to the host 200. Here, the response signal RSPNS may not include information requesting the authentication and may include information indicating that the operation regarding the received admin command is completed.

After the response signal RSPNS is provided to the host 200, the storage controller 110 may perform an authentication operation on the host 200. In this case, an authentication signal may be transmitted and received between the storage controller 110 and the host 200 through the second channel CH2. This will be described below with reference to FIG. 3.

Figure 3:
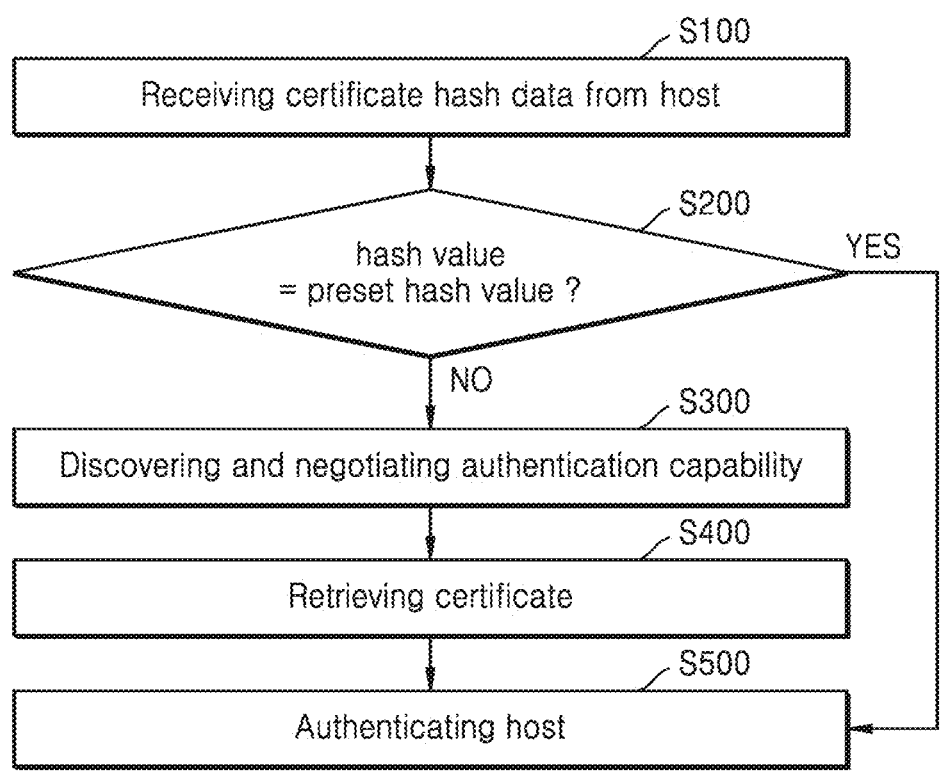
FIG. 3 is a diagram illustrating a method, performed by a storage controller, of performing an authentication operation on a host, according to some example embodiments of the inventive concepts.

FIG. 3 is a diagram illustrating a method, performed by a storage controller, of performing an authentication operation on a host, according to some example embodiments of the inventive concepts.

Referring to FIGS. 1 to 3, in operation S100, the storage controller 110 receives certificate hash data from the host 200 through the second channel 200. The certificate hash data may be data indicating a hash value for a certificate stored in the host 200.

In operation S200, the storage controller 110 performs an authentication operation on the host 200 according to whether a reference hash value of prestored reference hash data is consistent with a hash value of the certificate hash data. The reference hash data may be referred to as first hash data. The reference hash value may be referred to as a preset hash value or a first hash value. The certificate hash data may be referred to as second hash data. The hash value of the certificate hash data may be referred to as a second hash value. Herein, the authentication operation on the host 200 may be referred to as a first authentication operation.

When the hash value of the certificate hash data is different from the preset hash value ("NO" in S200), in operation S300, the storage controller 110 discovers and negotiate an authentication capability of the host 200 through the second channel CH2. Discovering and negotiating the authentication capability may be referred to as an operation of checking the authentication capability. The discovering and negotiating of the authentication capability will be described below with reference to FIG. 4.

In operation S400, the storage controller 110 retrieves the certificate through the second channel CH2. Retrieving the certificate may refer to performing an authentication operation on the certificate. Herein, the authentication operation on the certificate may be referred to as a second authentication operation. The second authentication operation may be an operation of authenticating whether the certificate itself is trustable information or not.

In operation S500, the storage controller 110 performs the first authentication operation through the second channel CH2.

On the other hand, when the hash value of the certificate hash data is consistent with the preset hash value ("YES" in S200), operation S500 is performed. That is, the first authentication operation is performed.

FIG. 4 is a diagram specifically illustrating discovering and negotiating the authentication capability, shown in FIG. 3.

Referring to FIGS. 3 and 4, in operation S310, the storage controller 110 transmits, to the host 200, an authentication request signal for requesting authentication capability data. In operation S320, the host 200 transmits the authentication capability data to the storage device 100, and the storage controller 110 receives the authentication capability data from the host 200. The authentication capability data may be data indicating information about a certificate version, an authentication protocol, and/or the like. The certificate version and/or the authentication protocol are used in the first authentication operation.

In operation S330, the storage controller 110 identifies the authentication protocol by using the authentication capability data. In addition, the storage controller 110 may also check a version of the certificate stored in the host 200, by using the authentication capability data.

In operation S340, the storage controller 110 transmits, to the host 200, an authentication request signal for requesting algorithm data. In operation S350, the storage controller 110 receives the algorithm data from the host 200. The algorithm data may be data indicating information about a cryptographic algorithm that is to be used in the first authentication operation.

In operation S360, the storage controller 110 identifies the cryptographic algorithm by using the algorithm data.

Operations S310 to S360 may be simultaneously or sequentially performed.

Operation orders between operations S310 to S330 and operations S340 to S360 may be interchanged with each other. For example, unlike the example shown in FIG. 4, operations S340 to S360 may be performed earlier than operation S310, and operations S310 to S330 may be performed after operation S360.

In operation S370, the storage controller 110 stores the authentication capability data and/or the algorithm data. For example, the storage controller 110 stores the authentication capability data and/or the algorithm data in internal memory included in the storage controller 110. As another example, the storage controller 110 stores the authentication capability data and/or the algorithm data in the volatile memory 120. As yet another example, the storage controller 110 stores the authentication capability data and/or the algorithm data in the non-volatile memory 130. Storing data in memory may refer to transferring, by the storage controller 110, the data, a write command (or program command), and/or an address to the memory.

FIGS. 5A and 5B are each a diagram specifically illustrating retrieving the certificate, shown in FIG. 3. Specifically, FIG. 5A is a diagram illustrating some example embodiments corresponding to the case where authentication of the certificate (or the second authentication operation) is successful, and FIG. 5B is a diagram illustrating some example embodiments corresponding to the case where the authentication of the certificate (or the second authentication operation) fails.

Referring to FIG. 5A, in operation S410, the storage controller 110 transmits, to the host 200, a request signal for requesting certificate data. In operation S420, the host 200 transmits the certificate data to the storage device 100, and the storage controller 110 receives the certificate data from the host 200. The certificate data may be data indicating certificate information of the host 200.

In operation S430, the storage controller 110 transmits, to the certification authority 300, a request signal for requesting to verify the certificate.

In operation S440, the certification authority 300 verifies a certificate chain. Specifically, the certification authority 300 verifies validity of a signature of each, or one or more, certificate in the certificate chain. The certificate chain may be information including the certificate of the host 200 and the certificate of the storage device 100.

In operation S450, the certification authority 300 transmits verification result data to the storage device 100, and the storage controller 110 receives the verification result data from the certification authority 300. The verification result data may be data indicating information about a result of verifying the validity of the certificate chain. For example, the verification result data may indicate a verification result of the certificate of the host 200.

When the verification result indicates that the verification of the certificate is successful, in operation S461, the storage controller 110 stores the verified certificate data. For example, the storage controller 110 stores the verified certificate data in the volatile memory 120. As another example, the storage controller 110 stores the verified certificate data in the non-volatile memory 130.

On the other hand, the verification result may indicate that the verification of the certificate fails. Referring to FIG. 5B, operations S410 to S450, which are described above with reference to FIG. 5A, are performed. When the verification of the certificate fails, in operation S471, the storage controller 110 logs certificate result data. The certificate result data may be data indicating information about a verification result of the certificate, the certificate corresponding to a verification target, and a hash value corresponding to the certificate. Logging the certificate result data may refer to storing, by the storage controller 110, the certificate result data in the non-volatile memory 130 (for example, a metadata region of the non-volatile memory 130). In operation S472, the storage controller 110 may transmit an interrupt signal to the host 200. The interrupt signal may be the response signal RSPNS with respect to an admin command received from the host 200. The interrupt signal corresponding to the response signal RSPNS may include, for example, information indicating that an error has occurred in the admin command transmitted by the host 200. Descriptions of the interrupt signal will be described below with reference to FIG. 14. In some example embodiments, the interrupt signal may be transmitted to the host 200 through the first channel CH1.

Figure 6A:
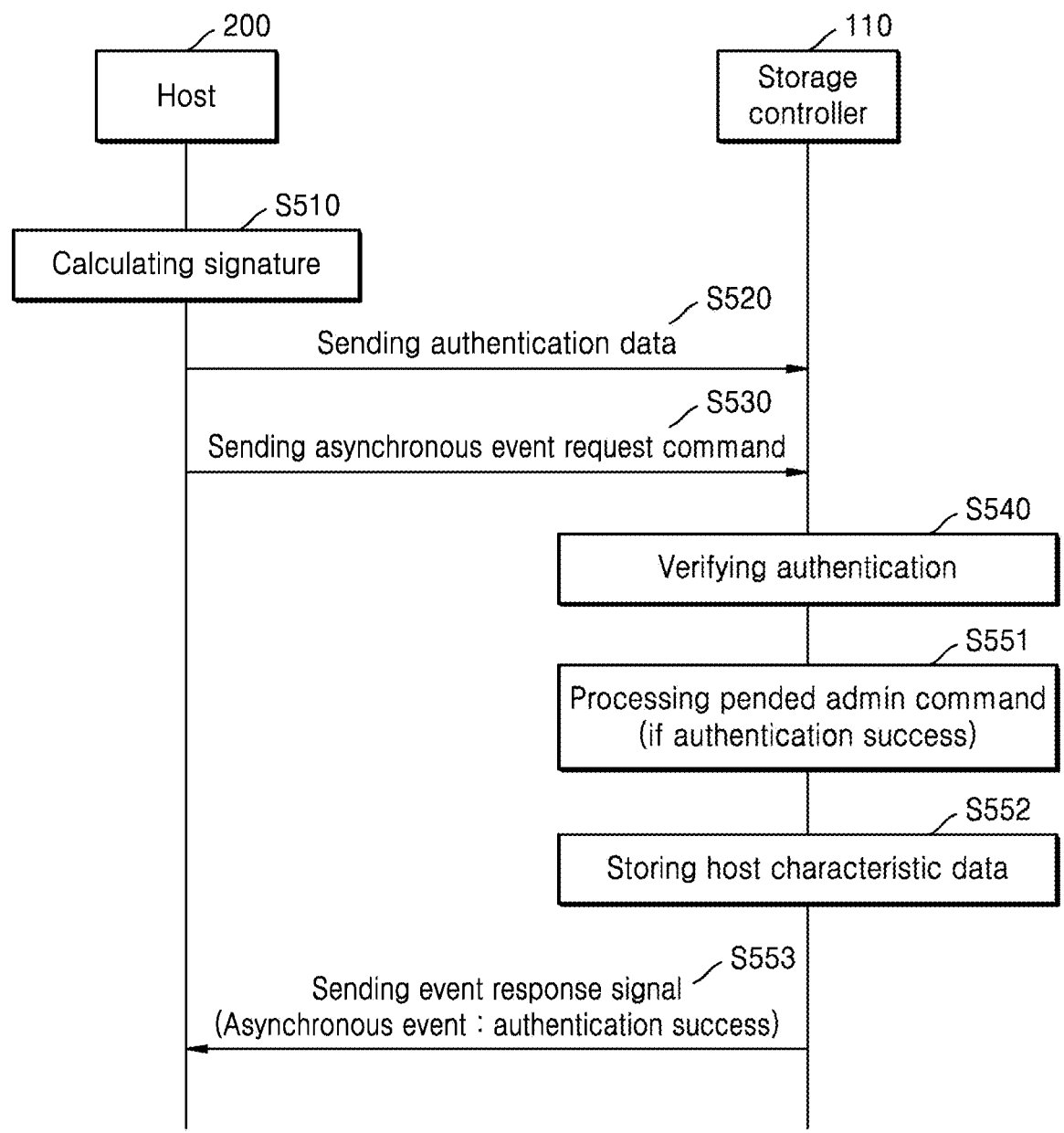
FIGS. 6A and 6B are each a diagram specifically illustrating performing authentication of a host, shown in FIG. 3.
Figure 6B:
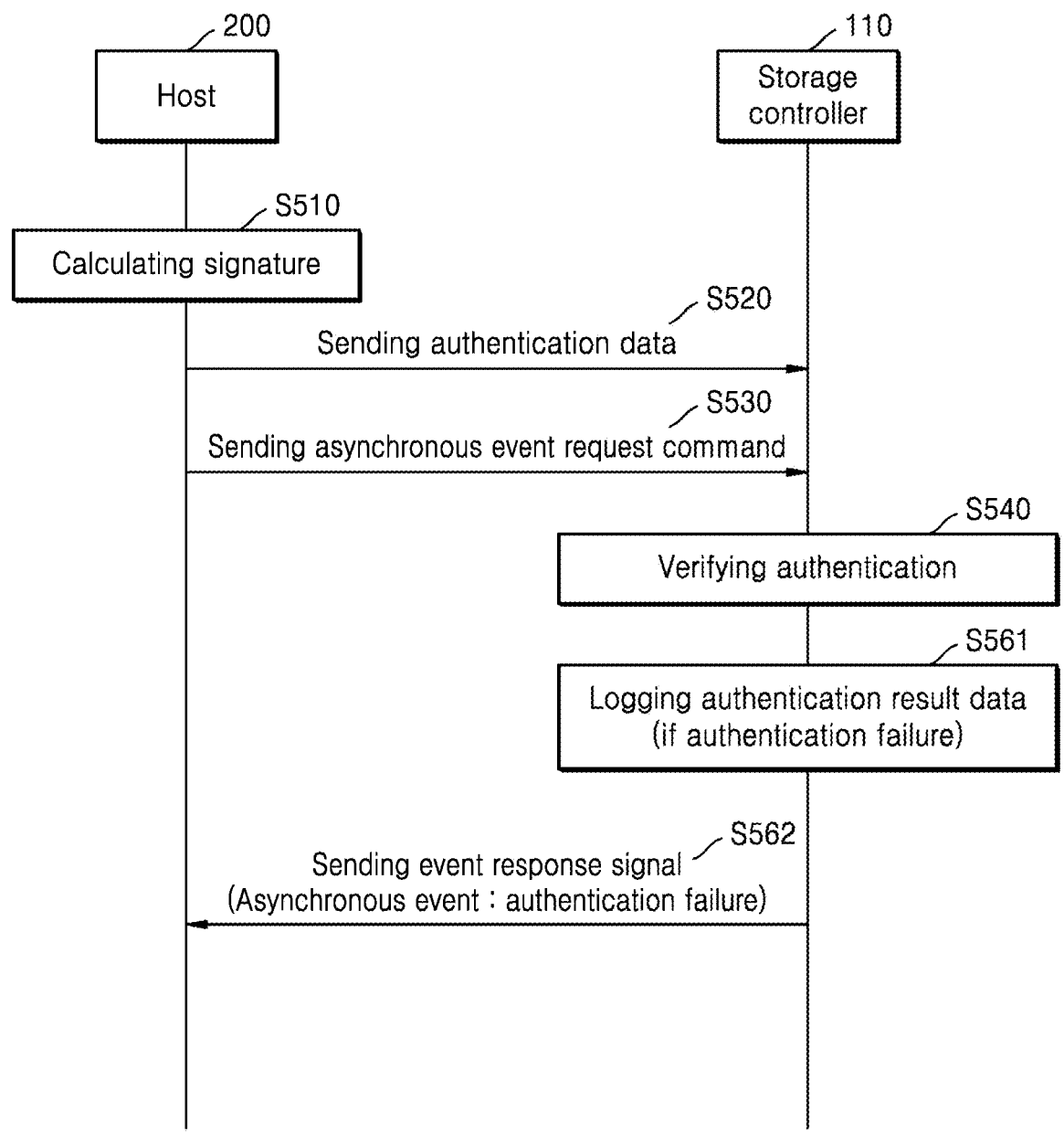

FIGS. 6A and 6B are diagrams specifically illustrating performing authentication on a host, shown in FIG. 3. Specifically, FIG. 6A is a diagram illustrating some example embodiments corresponding to the case where authentication for the host (or the first authentication operation) is successful, and FIG. 6B is a diagram illustrating some example embodiments corresponding to the case where the authentication for the host (or the first authentication operation) fails.

Referring to FIG. 6A, in operation S510, the host 200 calculate a signature. Specifically, the host 200 signs the certificate by using a private key and a specific cryptographic algorithm.

In operation S520, the host 200 transmits, to the storage device 100, authentication data indicating authentication information signed with the private key. The storage controller 110 receives the authentication data. In some example embodiments, the authentication data may include information signed with a key value included in the certificate, hash value information of the certificate, and/or a nonce.

In operation S530, the host 200 transmits an asynchronous event request command to the storage device 100. The storage controller 110 receives the asynchronous event request command. The asynchronous event request command may include content for requesting a result of an authentication operation on the host 200.

In operation S540, the storage controller 110 performs the first authentication operation on the host 200, based on the authentication data. Specifically, the storage controller 110 decrypts the authentication information by using a public key and a cryptographic algorithm, and determines whether the host 200 may be trusted, by using the decrypted authentication information.

When, as a result of the first authentication operation, the host 200 is authenticated, that is, the authentication is successful, the storage controller 110 processes a pending admin command in operation S551. Specifically, the storage controller 110 loads an admin command already stored in the pending command queue 121 (for example, the first admin command ADMCMD1 stored in the pending command queue 121 shown in FIG. 2) and performs an operation corresponding to the loaded admin command.

In operation S552, the storage controller 110 stores host characteristic data. In some example embodiments, the storage controller 110 may control memory to store the host characteristic data. Specifically, for example, the storage controller 110 stores the host characteristic data in the non-volatile memory 130 by transferring the host characteristic data, a program command, and/or an address to the non-volatile memory 130. The host characteristic data may include identifier information for identifying the host 200, hash value information of the certificate, protocol information used in the first authentication operation, cryptographic algorithm information used in the first authentication operation, and/or processed admin command information.

In operation S553, the storage controller 110 transmits, to the host 200, an event response signal corresponding to the asynchronous event request command. Here, a specific field of the event response signal may include information indicating authentication success.

On the other hand, the authentication may fail as a result of the first authentication operation. Referring to FIG. 6B, operations S510 to S540, which are described with reference to FIG. 6A, are performed. When the authentication for the host 200 fails, the storage controller 110 logs the authentication result data in operation S561. Logging the authentication result data may refer to storing log data for the authentication result data in the non-volatile memory 130. The logged authentication result data may include information (for example, identifier information) about an authentication-failed host. However, the inventive concepts are not limited thereto. In operation S562, the storage controller 110 transmits, to the host 200, an event response signal corresponding to the asynchronous event request command. Here, a specific field of the event response signal may include information indicating authentication failure.

According to the above descriptions, the storage device 100 may reduce or prevent occurrences of a malicious user attack from affecting the storage device 100. The storage device 100 may require authentication of host 200 issuing an admin command, but may not require authentication of a host 200 issuing a command that is not an admin command. Therefore, the performance and reliability of the storage device 100 may be improved by protecting an admin command from an attack by a malicious user.

The host 200 may know, in advance, the type of admin command included in the list information. In this case, the host 200 may provide the authentication data, together with the corresponding admin command, to the storage device 100.

Figure 7:
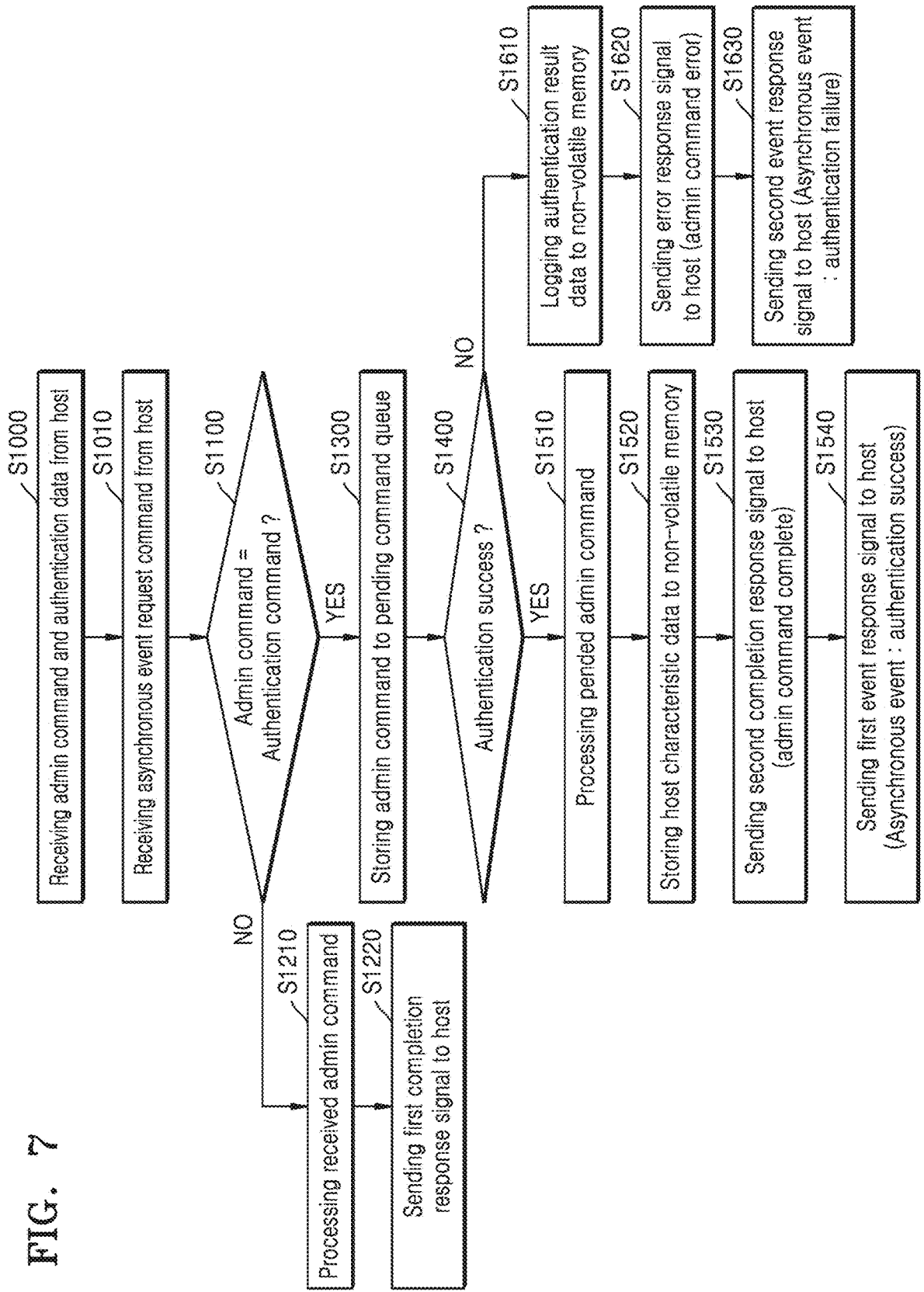
FIG. 7 is a diagram illustrating another method, performed by a storage controller, of performing an authentication operation on a host, according to some example embodiments of the inventive concepts.

FIG. 7 is a diagram illustrating another method, performed by a storage controller, of performing an authentication operation on a host, according to some example embodiments of the inventive concepts.

Referring to FIGS. 1 and 7, in operation S1000, the storage controller 110 receives an admin command and authentication data together from the host 200. In some example embodiments, the storage controller 110 receives the authentication data through a second channel in a period at least partially overlapping a period in which the admin command is received by the storage device 100 through a first channel. In operation S1010, the storage controller 110 receives an asynchronous event request command from the host 200. Unlike the example shown in FIG. 7, operation S1010 may be performed earlier than operation S1000.

In operation S1100, the storage controller 110 checks whether the admin command is an authentication command. The authentication command may be an admin command transferred by an authenticated host. For example, the authentication command may be an admin command included in the list information of the command list data 111 stored in advance. The storage controller may determine that the admin command is an authentication command in response to determining that the admin command is included in the list information of the command list data 111.

When the admin command is not an authentication command ("NO" in S1100), the storage controller 110 processes the received admin command in operation S1210. Specifically, the storage controller 110 performs an operation corresponding to the received admin command. In operation S1220, the storage controller 110 transmits a first completion response signal to the host 200. The first completion response signal may be a signal indicating that the operation corresponding to the received admin command is completed.

When the admin command is an authentication command ("YES" in S1100), the storage controller 110 stores the received admin command in the pending command queue 121 in operation S1300. By storing the received admin command in the pending command queue 121, the operation corresponding to the received admin command is pending.

In operation S1400, the storage controller 110 performs the first authentication operation on the host 200, based on the authentication data.

When the host 200 is authenticated ("YES" in S1400) as a result of the first authentication operation, the storage controller 110 processes the pending admin command in operation S1510. Specifically, the storage controller 110 loads the admin command stored in the pending command queue 121 and performs the operation corresponding to the admin command. In operation S1520, the storage controller 110 stores host characteristic data in the non-volatile memory 130. In operation S1530, the storage controller 110 transmits, to the host 200, a second completion response signal corresponding to the admin command. The second completion response signal may be a signal indicating that the operation corresponding to the pending admin command is completed. In operation S1540, the storage controller 110 transmits, to the host 200, a first event response signal corresponding to the asynchronous event request command. Here, a specific field of the first event response signal may include information indicating authentication success. When operation S1010 is performed earlier than operation S1000 unlike the example shown in FIG. 7, operation S1540 may be performed earlier than operation S1530.

On the other hand, when the authentication fails ("NO" in S1400) as a result of the first authentication operation, the storage controller 110 logs authentication result data to the non-volatile memory 130 in operation S1610. Here, the authentication result data may include information (for example, identifier information) about an authentication-failed host. In operation S1620, the storage controller 110 transmits, to the host 200, an error response signal corresponding to the admin command. The error response signal may include information indicating that the pending admin command has an error. In operation S1630, the storage controller 110 transmits, to the host 200, a second event response signal corresponding to the asynchronous event request command. Here, a specific field of the second event response signal may include information indicating authentication failure. When operation S1010 is performed earlier than operation S1000 unlike the example shown in FIG. 7, operation S1630 may be performed earlier than operation S1620.

Figure 8:
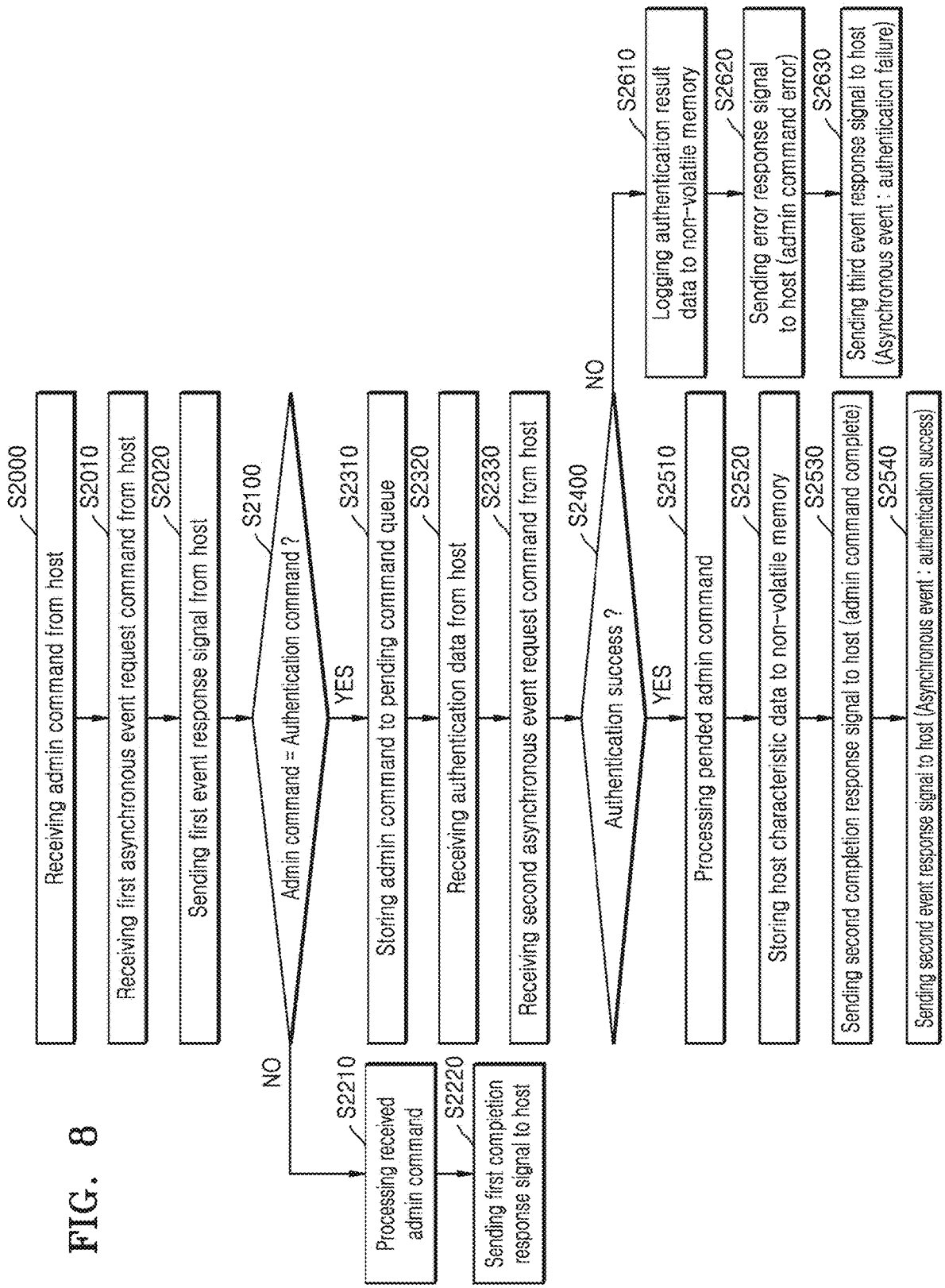
FIG. 8 is a diagram illustrating yet another method, performed by a storage controller, of performing an authentication operation on a host, according to some example embodiments of the inventive concepts.

FIG. 8 is a diagram illustrating yet another method, performed by a storage controller, of performing an authentication operation on a host, according to some example embodiments of the inventive concepts.

Referring to FIGS. 1, 7, and 8, in operation S2000, the storage controller 110 receives an admin command from the host 200. In operation S2010, the storage controller 110 receives a first asynchronous event request command from the host 200. A specific field of the first asynchronous event request command includes information for requesting to generate a nonce. In operation S2020, the storage controller 110 transmits a first event response signal to the host 200. A specific field of the first event response signal may include a first nonce.

Operation S2100 is the same as operation S1100 shown in FIG. 7, operations S2210 and S2220 are respectively the same as operations S1210 and 1220 shown in FIG. 7, and operation S2310 is the same as operation S1300 shown in FIG. 7.

In operation S2320, the storage controller 110 receives authentication data from the host 200. Here, the authentication data may include information signed with a key value included in a certificate, hash value information of the certificate, and/or a second nonce.

In operation S2330, the storage controller 110 receives a second asynchronous event request command from the host 200. The second asynchronous event request command includes content for requesting a result of an authentication operation on the host 200.

In operation S2400, the storage controller 110 decrypts the authentication data by using a cryptographic algorithm and a public key for the host 200, compares the first nonce with the second nonce, and verifies authentication success or not by determining a sameness between the first nonce and the second nonce.

Operations S2510 to S2530 are respectively the same as operations S1510 to S1530 shown in FIG. 7.

In operation S2540, the storage controller 110 transmits a second event response signal to the host 200. The second event response signal may be a response signal corresponding to the second asynchronous event request command. A specific field of the second event response signal may include information indicating authentication success.

Operations S2610 and S2620 are respectively the same as operations S1610 and S1620 shown in FIG. 7.

In operation S2630, the storage controller 110 transmits a third event response signal to the host 200. The third event response signal may be a response signal corresponding to the second asynchronous event request command. A specific field of the third event response signal may include information indicating authentication failure.

Respective orders of operations S2000, S2010, and S2330 are not limited to the example shown in FIG. 8. In addition, operation S2330 may be performed earlier than operation S2100 unlike the example shown in FIG. 8. Operation S2020 may be performed after operation S2010.

Respective performing orders of operations S2320 and S2330 are also not limited to the example shown in FIG. 8.

A sequential relationship between operations S2530 and S2540 is the same as a sequential relationship between operations S2000 and S2330. For example, when operation S2000 is performed earlier than operation S2330, operation S2530 is performed earlier than operation S2540.

A sequential relationship between operations S2620 and S2630 is the same as the sequential relationship between operations S2000 and S2330. For example, when operation S2000 is performed earlier than operation S2330, operation S2620 is performed earlier than operation S2630.

Figure 9:
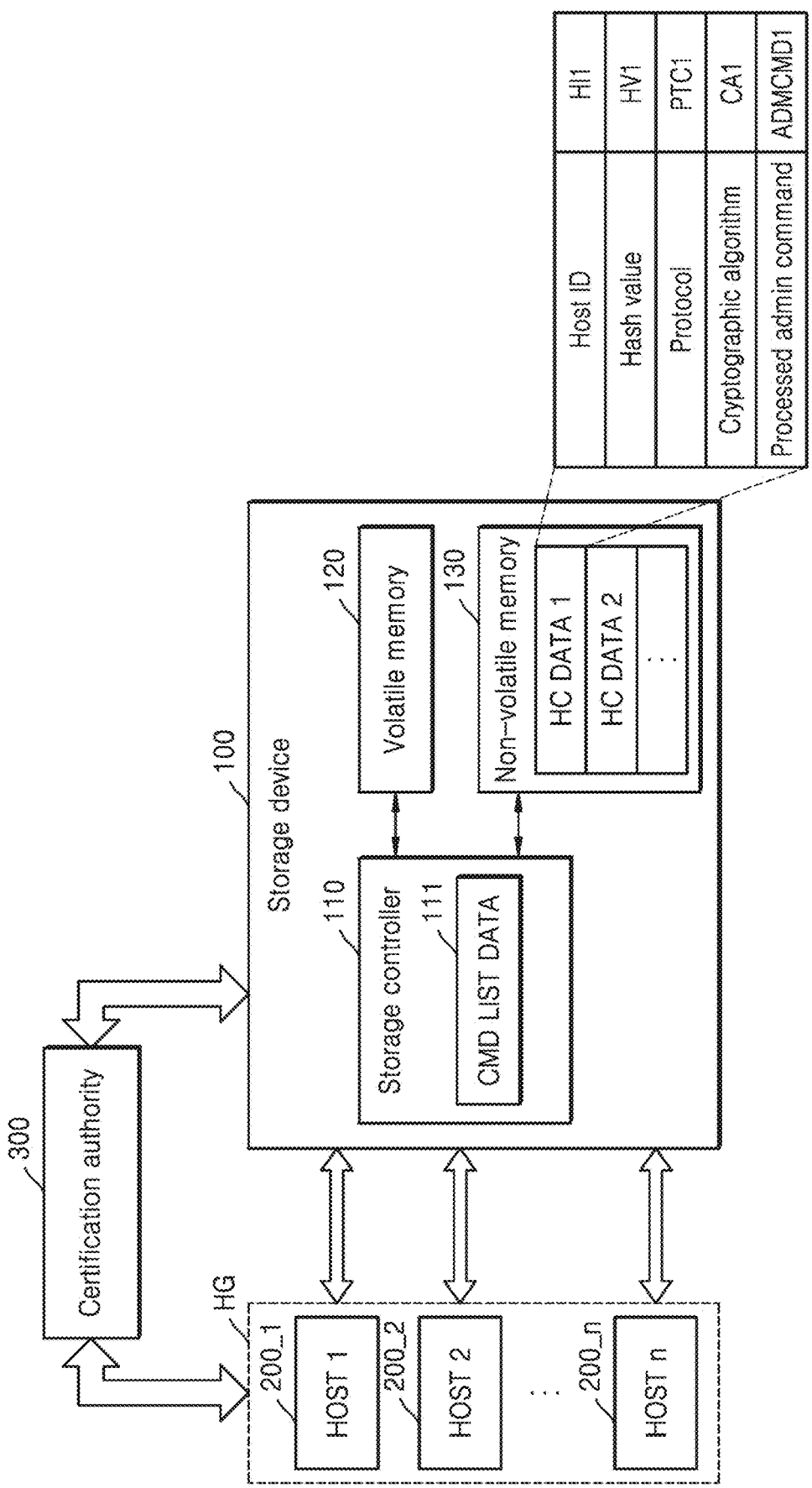
FIG. 9 is a diagram illustrating a storage system according to some example embodiments of the inventive concepts.

FIG. 9 is a diagram illustrating a storage system according to some example embodiments of the inventive concepts.

Referring to FIG. 9, the storage system according to some example embodiments of the inventive concepts may include the storage device 100, a host group HG including first to n-th hosts 200_1, 200_2, ..., and 200_n, and the certification authority 300.

The storage device 100 may perform all, or one or more, of the operations described above with reference to FIG. 1. The non-volatile memory 130 included in the storage device 100 may store one or more pieces of characteristic data corresponding to a specific host. For example, the non-volatile memory 130 may store first host characteristic data HC DATA 1 and second host characteristic data HC DATA 2. However, the inventive concepts are not limited thereto. Hereinafter, it is assumed that the first host characteristic data HC DATA 1 is data corresponding to the first host 200_1 and the second host characteristic data HC DATA 2 is data corresponding to the second host 200_2.

Each, or one or more, host characteristic data stored in the non-volatile memory 130 includes identifier information of the corresponding host, hash vale information of a certificate, protocol information used in an authentication operation, cryptographic algorithm information used in the authentication operation, and/or admin command information. For example, the first host characteristic data HC DATA 1 may include identifier information HI1 of the first host 200_1, first hash value information HV1 of a certificate stored in the first host 200_1, first protocol information PTC1 used in an authentication operation on the first host 200_1, and/or first cryptographic algorithm information CA1 used in the authentication operation on the first host 200_1. In addition, an admin command in the admin command information included in the first host characteristic data HC DATA 1 may be the first admin command ADMCMD1. However, the inventive concepts are not limited thereto.

In some example embodiments, after the storage device 100 stores the first host characteristic data HC DATA 1, the first host 200_1 may transmit the first admin command ADMCMD1 again to the storage device 100. In this case, because the storage controller 110 has completed the authentication operation on the first host 200_1, the storage controller 110 may omit the authentication operation on the first host 200_1 and perform an operation corresponding to the first admin command ADMCMD1.

In some example embodiments, after the storage device 100 stores the first host characteristic data HC DATA 1, the first host 200_1 may transmit a first inactive admin command to the storage device 100. The first inactive admin command may be a command for directing to deactivate the operation corresponding to the first admin command ADMCMD1. Alternatively, the first inactive admin command may be a command for directing an operation that is opposite to the operation corresponding to the first admin command ADMCMD1. For example, when the first admin command ADMCMD1 is a create-queue command for directing to create a command queue, the first inactive admin command may be a delete-queue command for directing to delete a command queue. However, the inventive concepts are not limited thereto. According to some example embodiments, by changing a bit value located in a specific field of an admin command, an operation corresponding to the admin command may be activated or deactivated. In this case, assuming that the operation corresponding to the admin command is performed (activated) when the bit value located in the specific field of the admin command is set to a first bit value, the first inactive admin command may be implemented by setting a bit value, which is located in a specific field of a first admin command, to a second bit value that is different from the first bit value. Because the first host 200_1 has been authenticated and the admin command in the admin command information included in the first host characteristic data HC DATA 1 is the first admin command ADMCMD1, only the first host 200_1 may deactivate the operation corresponding to the first admin command ADMCMD1. The storage controller 110 may omit the authentication operation on the first host 200_1 and may deactivate the operation corresponding to the first admin command in response to the first inactive admin command. An inactive admin command may be an unset command.

In some example embodiments, after the storage device 100 stores the first host characteristic data HC DATA 1 and the second host characteristic data HC DATA 2, the second host 200_2 may transmit a first inactive admin command for the first admin command ADMCMD1 to the storage device 100. In this case, because an entity having transmitted the first admin command ADMCMD1 is the first host 200_1 and the admin command in the admin command information included in the second host characteristic data HC DATA 2 is the second admin command ADMCMD2, the storage controller 110 may deactivate the operation corresponding to the first admin command ADMCMD1 according to whether identity between the first host 200_1 and the second host 200_2 is admitted. A method of deactivating an operation according to a command, based on whether the first host 200_1 is identical to the second host 200_2, will be described below with reference to FIG. 10.

Figure 10:
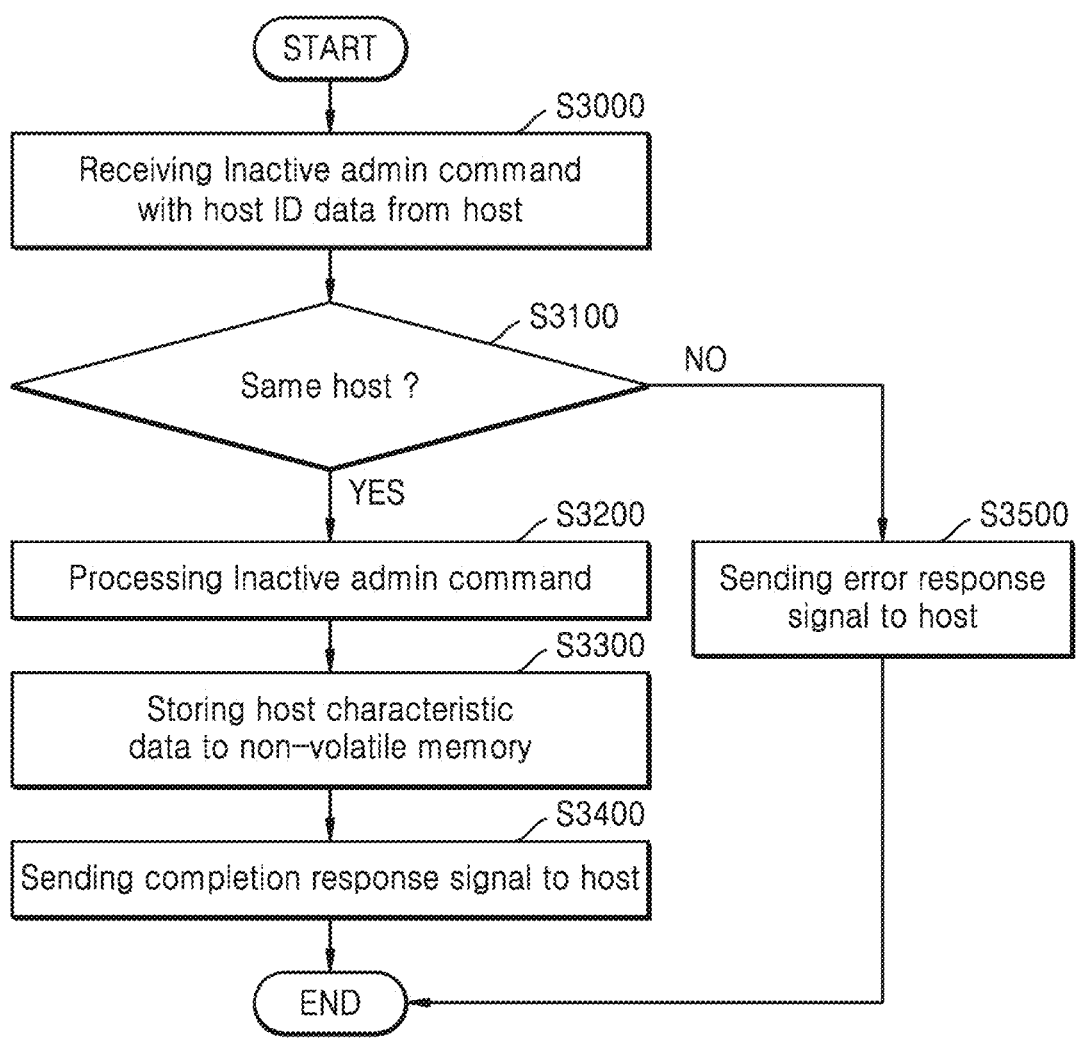
FIG. 10 is a diagram illustrating an operation, performed by a storage controller, of responding to an inactive administration command, according to some example embodiments of the inventive concepts.

FIG. 10 is a diagram illustrating an operation, performed by a storage controller, of responding to an inactive admin command, according to some example embodiments of the inventive concepts.

Referring to FIGS. 9 and 10, in operation S3000, the storage controller 110 receives an inactive admin command (for example, a first inactive admin command for directing to deactivate an operation corresponding to the first admin command ADMCMD1), together with host identifier data, from a host (for example, the second host 200_2). Here, the host identifier data includes, for example, identifier information of the second host 200_2.

In operation S3100, the storage controller 110 determines identity between two hosts. Specifically, the storage controller 110 compares the identifier information HI1 of the first host 200_1 with the identifier information of the second host 200_2, based on the first host characteristic data HC DATA 1 stored in the non-volatile memory 130.

When the identity is admitted ("YES" in S3100), the storage controller 110 processes the inactive admin command in operation S3200. Specifically, the storage controller 110 performs an operation corresponding to the inactive admin command or deactivates the operation corresponding to the admin command.

In operation S3300, the storage controller 110 stores host characteristic data in the non-volatile memory 130. Referring to FIG. 9, for example, when the admin command information included in the first host characteristic data HC DATA 1 indicates the first admin command ADMCMD1, the storage controller 110 changes the first admin command ADMCMD1 in the admin command information to the first inactive admin command. In some example embodiments, the storage controller 110 erases the admin command information included in the first host characteristic data HC DATA 1.

In operation S3400, the storage controller 110 transmits a completion response signal to the host 200.

When the identity is denied ("NO" in S3100), the storage controller 110 transmits an error response signal to the host 200 in operation S3500.

Figure 11:
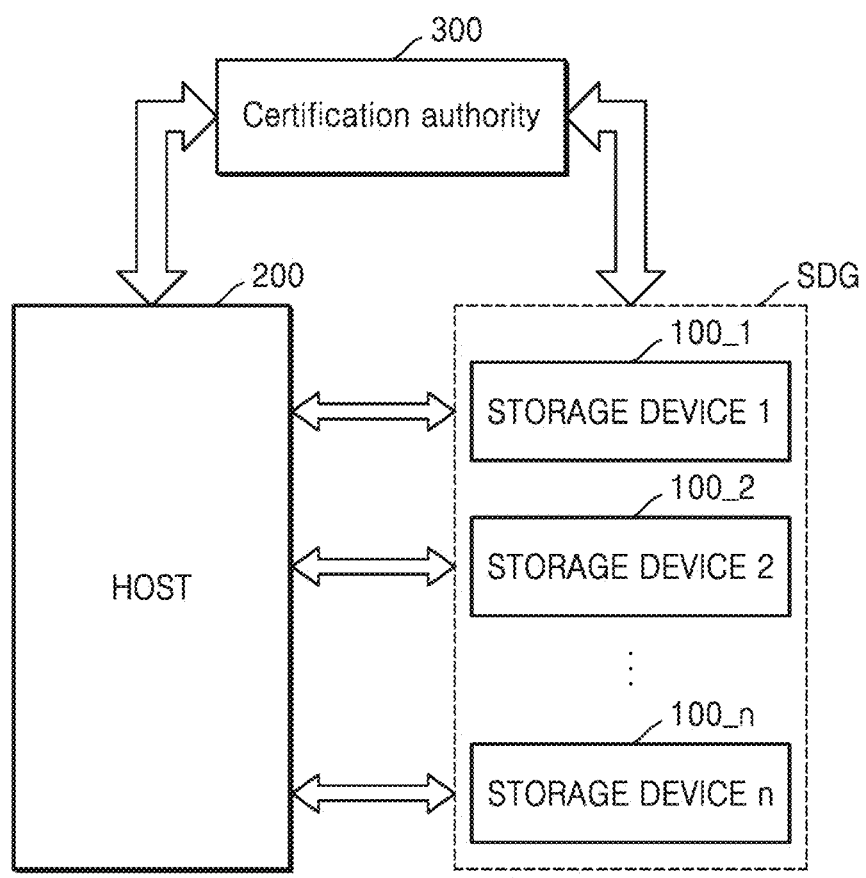
FIG. 11 is a diagram illustrating a storage system according to some example embodiments of the inventive concepts.

FIG. 11 is a diagram illustrating a storage system according to some example embodiments of the inventive concepts.

Referring to FIG. 11, the storage system according to some example embodiments of the inventive concepts may include a storage device group SDG including first to n-th storage devices 100_1, 100_2, ..., and 100_n, the host 200, and the certification authority 300. The first to n-th storage devices 100_1, 100_2, ..., and 100_n may each perform the operations of the storage device 100, which are described above with reference to FIG. 1.

Figure 12:
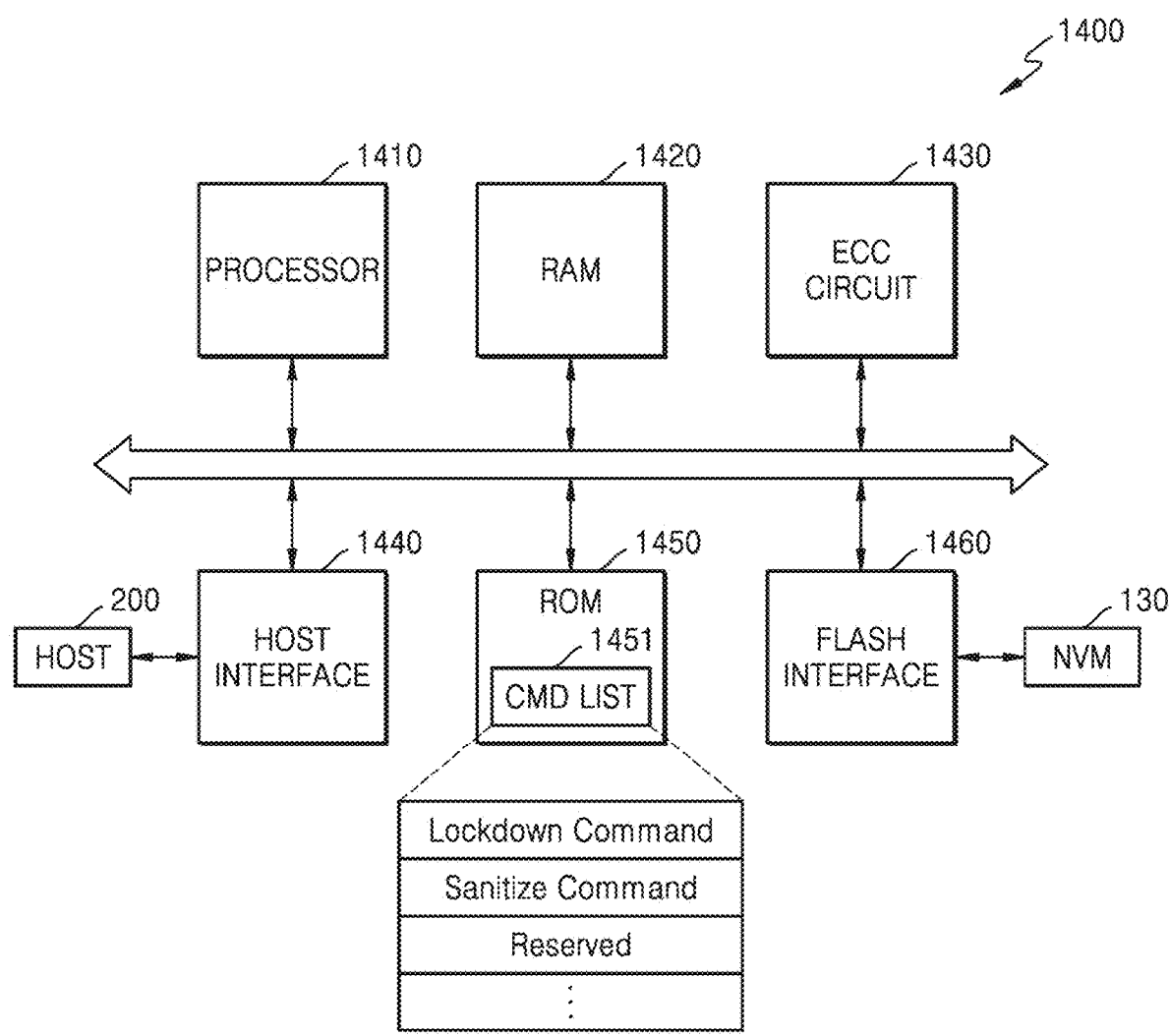
FIG. 12 is a diagram illustrating a storage controller according to some example embodiments of the inventive concepts.

FIG. 12 is a diagram illustrating a storage controller according to some example embodiments of the inventive concepts.

Referring to FIG. 12, a storage controller 1400 may include a processor 1410, RAM 1420, an error correction circuit 1430, a host interface 1440, ROM 1450, and a flash interface 1460.

The processor 1410 may control overall operations of the storage controller 1400. The processor 1410 may be implemented by a general-purpose processor, a dedicated processor, an application processor, or the like. The processor 1410 may include one or more central processing unit (CPU) cores 1110. In some example embodiments, the processor 1410 may further include an accelerator, which is a dedicated circuit for high-speed data calculation such as artificial intelligence (AI) data calculation or the like.

The RAM 1420 may be used as buffer memory, cache memory, operation memory, and/or the like of the storage controller 1400. For example, the RAM 1420 may be buffer memory. In some example embodiments, the RAM 1420 may store an admin command stored in the volatile memory 120 shown in FIG. 1. Specifically, the processor 1410 may load the admin command stored in the volatile memory 120 into the RAM 1420.

The error correction circuit 1430 may generate an error correction code (ECC) for correcting a fail bit or an error bit of data. The error correction circuit 1430 may perform error correction encoding on data, thereby generating parity bitadded data. The parity bit (not shown) may be stored in the non-volatile memory 130. The error correction circuit 1430 may perform error correction decoding on data, and here, the error correction circuit 1430 may correct an error by using a parity. For example, the error correction circuit 1430 may correct an error by using various coded modulation schemes such as a Low Density Parity Check (LDPC) code, a Bose-Chaudhuri-Hocquenghem (BCH) code, a turbo code, a Reed-Solomon code, a convolution code, a recursive systematic code (RSC), trellis-coded modulation (TCM), block coded modulation (BCM), and/or the like. The error correction circuit 1430 may calculate an error correction code value of data to be programmed. The error correction circuit 1430 may perform an error correction operation on read data, based on an error correction code value. The error correction circuit 1430 may perform an error correction operation on restored data in an operation of restoring failed data.

The storage controller 1400 may communicate with the host 200 through the host interface 1440.

The ROM 1450 may store various pieces of information, which are required, or sufficient, for the storage controller 1400 to operate, in the form of firmware. In some example embodiments, a portion of a storage space of the ROM 1450 may be referred to as a secure region 1451. The secure region 1451 may be a storage space requiring, or utilizing, relatively high security. Command list-related information CMD LIST may be stored in the secure region 1451. The command list-related information CMD LIST may be the command list data 111 described above with reference to FIG. 1. The command list-related information CMD LIST may include, for example, information about a lockdown command and information about a sanitize command. However, the inventive concepts are not limited thereto. Some fields of the secure region 1451 may be reserved.

The storage controller 1400 may communicate with the non-volatile memory 130 through the flash interface 1460. The flash interface 1460 may include, for example, a NAND interface.

Figure 13:
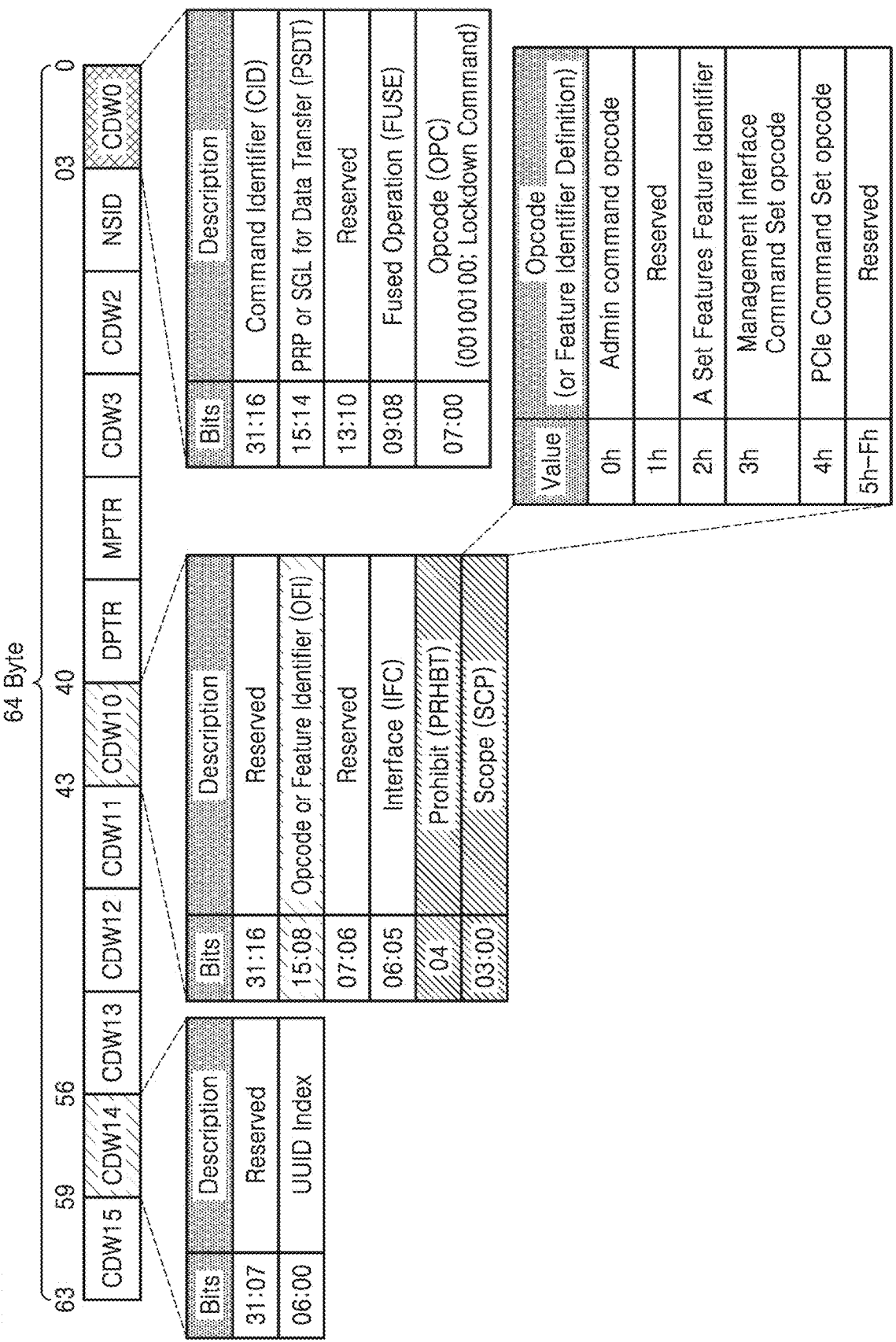
FIG. 13 is a diagram illustrating a submission queue entry for a lockdown command, according to some example embodiments of the inventive concepts.

FIG. 13 is a diagram illustrating a submission queue entry for a lockdown command, according to some example embodiments of the inventive concepts.

Referring to FIG. 13, the submission queue entry is defined in the NVMe specifications. The submission queue entry may include, for example, 16 command double words, and the size of the submission queue entry may be 64 bytes. One command double word may have a size of 4 bytes.

The submission queue entry may include a command double word 0 (CDW 0), a namespace identifier NSID, a command double word 2 (CDW 2), a command double word 3 (CDW 3), a metadata pointer MPTR, a data pointer DPTR, a command double word 10 (CDW 10), a command double word 11 (CDW 11), a command double word 12 (CDW 12), a command double word 13 (CDW 13), a command double word 14 (CDW 14), and/or a command double word 15 (CDW 15).

The lockdown command is defined in the NVMe specifications (for example, section 5.19 in NVMe specifications 2.0a), and the submission queue entry for the lockdown command may use the CDW 0, the CDW 10, and the CDW 14.

The CDW 0 may include a command identifier field CID, a physical region page (PRP) and/or scatter gather lists (SGL) field for data transfer PSDT, a fused operation field FUSE, and/or an opcode field OPC. Here, the opcode field OPC corresponding to the lockdown command may be set to "00100100".

The CDW 10 may include an opcode or feature identifier field OFI, an interface field IFC, a prohibit field PRHBT, and/or a scope field SCP. Here, a bit value of the prohibit field PRHBT corresponding to the lockdown command may be set to a first bit value (for example, "1") or a second bit value (for example, "0"). When the prohibit field PRHBT is set to the first bit value, this indicates prohibiting the execution of a specific admin command. When the prohibit field PRHBT is set to the second bit value, this indicates permitting the execution of a specific admin command. The scope field SCP corresponding to the lockdown command may have a value ranging from "0h" to "Fh". "0h" may be an admin command opcode, "2h" may be a set features feature identifier, "3h" may be a management interface command set opcode, and "4h" may be a PCIe command set opcode. "1h" and "5h" to "Fh" are reserved. By setting the bit of each, or one or more, of the opcode or feature identifier field OFI, the prohibit field PRHBT, and the scope field SCP, the execution of a specific admin command may be prohibited or permitted.

The CDW 14 may include a universally unique identifier (UUID) index field UUID INDEX.

Figure 14:
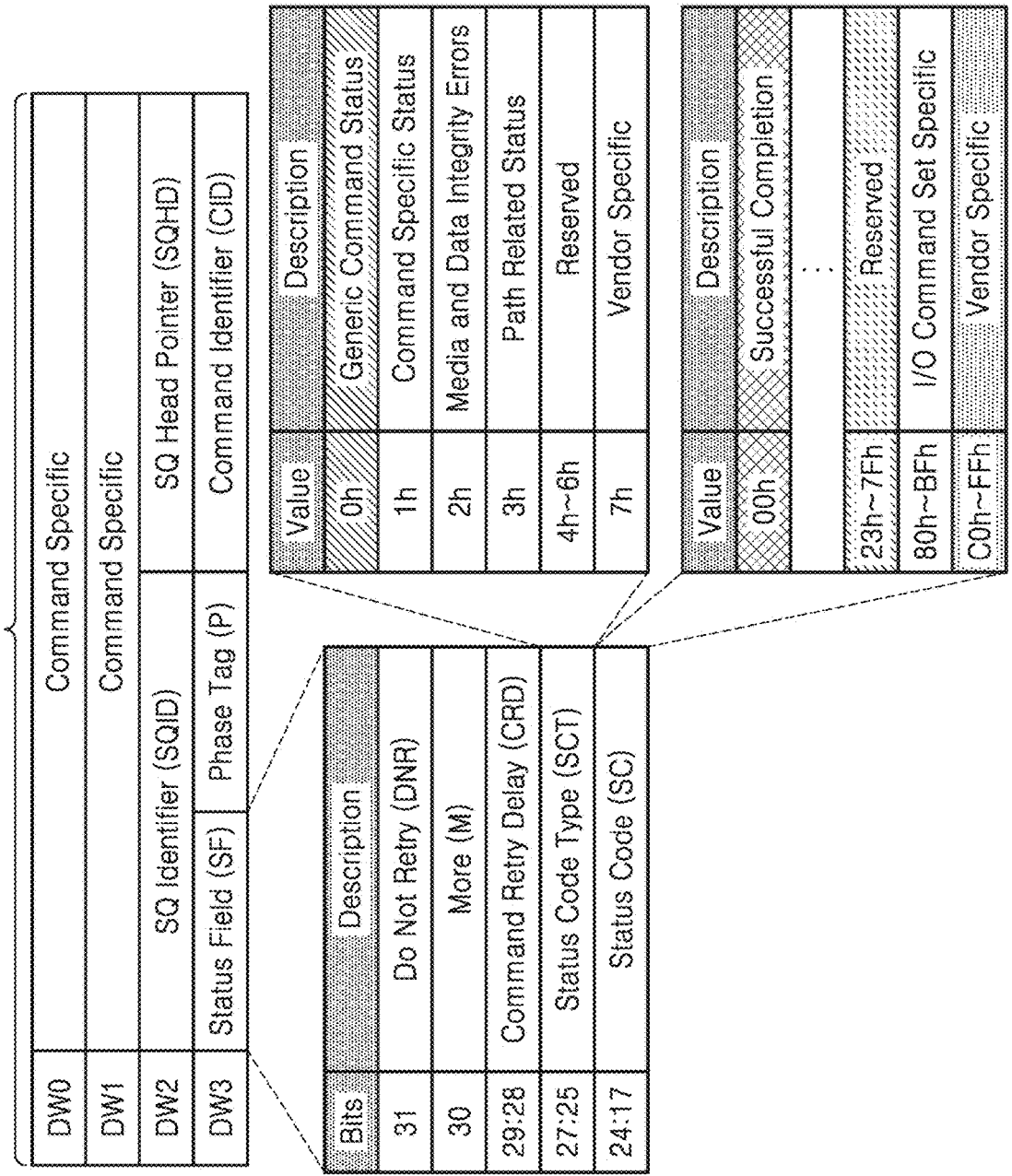
FIG. 14 is a diagram illustrating a completion queue entry for a response signal corresponding to a lockdown command, according to some example embodiments of the inventive concepts.

FIG. 14 is a diagram illustrating a completion queue entry for a response signal corresponding to a lockdown command, according to some example embodiments of the inventive concepts.

Referring to FIG. 14, the completion queue entry is defined in the NVMe specifications. The completion queue entry may include, for example, 4 double words, and the size of the completion queue entry may be 16 bytes. However, the inventive concepts are not limited thereto, and the completion queue entry may include 5 or more double words.

The completion queue entry may include a double word 0 (DW0), a double word 1 (DW1), a double word 2 (DW2), and/or a double word 3 (DW3).

The DW0 and the DW1 may each include a field that is specifically defined according to the type of command.

The DW2 may include a submission queue identifier field SQID and a submission queue head pointer field SQHD.

The DW3 may include a status field SF indicating a status of a command that is in progress for completion, a phase tag field P for identifying whether the completion queue entry is new, and/or a command identifier field CID for identifying the command that is in progress for completion. In the case of the completion queue entry for a response signal corresponding to the lockdown command, the status field SF may include a Do Not Retry field DNR, a More field M, a Command Retry Delay field CRD, a Status Code Type field SCT, and/or a Status Code field SC.

A value of the Status Code Type field SCT being "0h", "1h", "2h", "3h", "4h to 6h", or "7h" indicates that the Status Code Type is Generic Command Status, Command Specific Status, Media and Data Integrity Errors, Path Related Status, Reserved, and/or Vendor Specific, respectively.

In some example embodiments, when the value of the Status Code Type field SCT is "0h", a value of the status code field SC being "00h" indicates Successful Completion. Successful Completion may mean that an operation regarding the lockdown command is normally completed. The value of the Status Code field SC being one of "23h" to "7Fh" indicates Reserved. The value of the Status Code field SC being one of "C0h" to "FFh" indicates Vendor Specific. Specifically, in the case of the first completion response signal (for example, in operation S1220 of FIG. 7 or operation S2220 of FIG. 8) or the second completion response signal (for example, in operation S1530 of FIG. 7 or operation S2530 of FIG. 8) described above with reference to FIG. 7 or 8, the value of the Status Code Type field SCT may be "0h" and the value of the Status Code field SC may be "00h", in the completion queue entry shown FIG. 14.

In some example embodiments, information indicating that the operation regarding the lockdown command fails may be marked in Reserved or Vendor Specific of the Status Code field SC. For example, when the operation regarding the lockdown command is not normally completed, the value of the Status Code Type field SCT may be "0h" and the value of the Status Code field SC may be one of "23h" to "7Fh". As another example, when the operation regarding the lockdown command is not normally completed, the value of the Status Code Type field SCT may be "0h" and the value of the Status Code field SC may be one of "C0h" to "FFh". Specifically, in the case of the interrupt signal (for example, in operation S472 of FIG. 5B) described above with reference to FIG. 5B and the error response signal (for example, in operation S1620 of FIG. 7 or operation S2620 of FIG. 8) described above with reference to FIG. 7 or 8, the value of the Status Code Type field SCT may be "0h" and the value of the Status Code field SC may be one of "23h" to "7Fh" or one of "C0h" to "FFh", in the completion queue entry shown FIG. 14.

Figure 15:
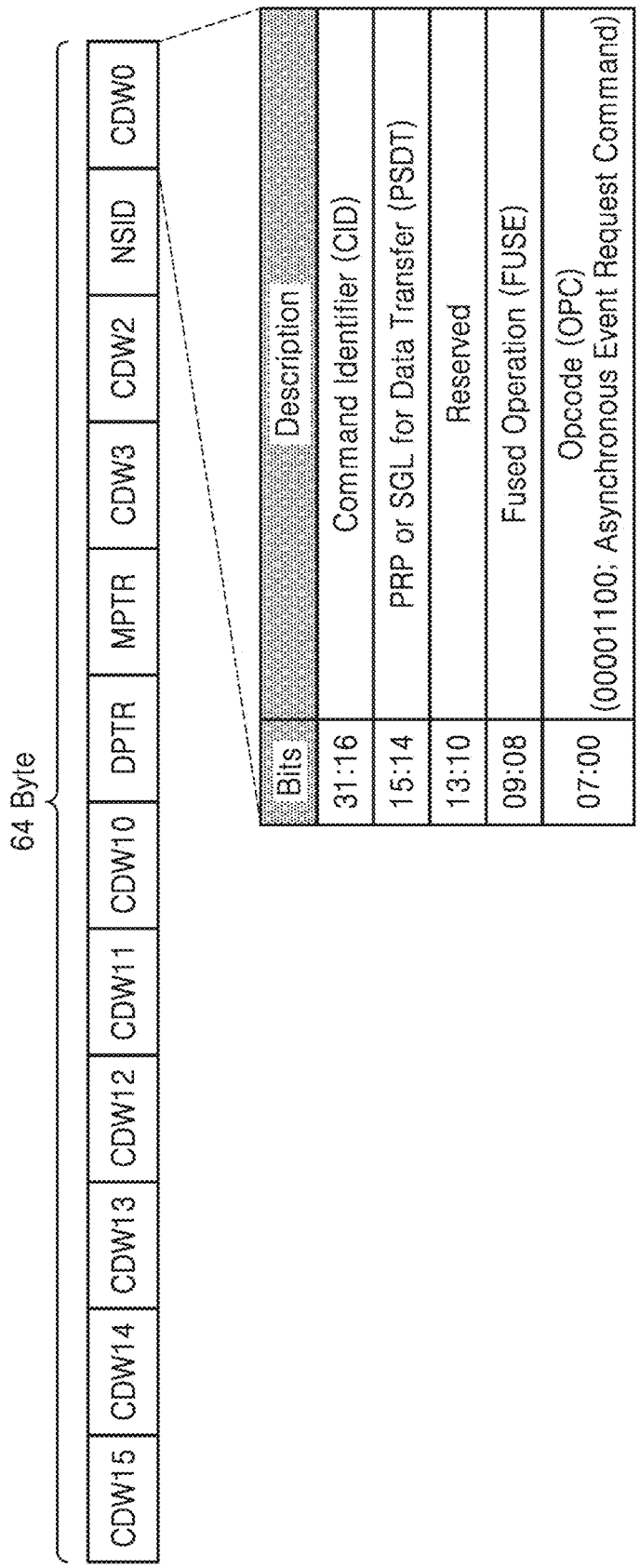
FIG. 15 is a diagram illustrating a submission queue entry for an asynchronous event request command, according to some example embodiments of the inventive concepts.

FIG. 15 is a diagram illustrating a submission queue entry for an asynchronous event request command, according to some example embodiments of the inventive concepts.

Referring to FIG. 15, the asynchronous event request command is defined in the NVMe specifications (for example, section 5.2 in NVMe specifications 2.0a).

The CDW 0 may include the command identifier field CID, the PRP or SGL field for data transfer PSDT, the fused operation field FUSE, and/or the opcode field OPC. Here, the opcode field OPC corresponding to the asynchronous event request command may be set to "00001100".

Figure 16A:
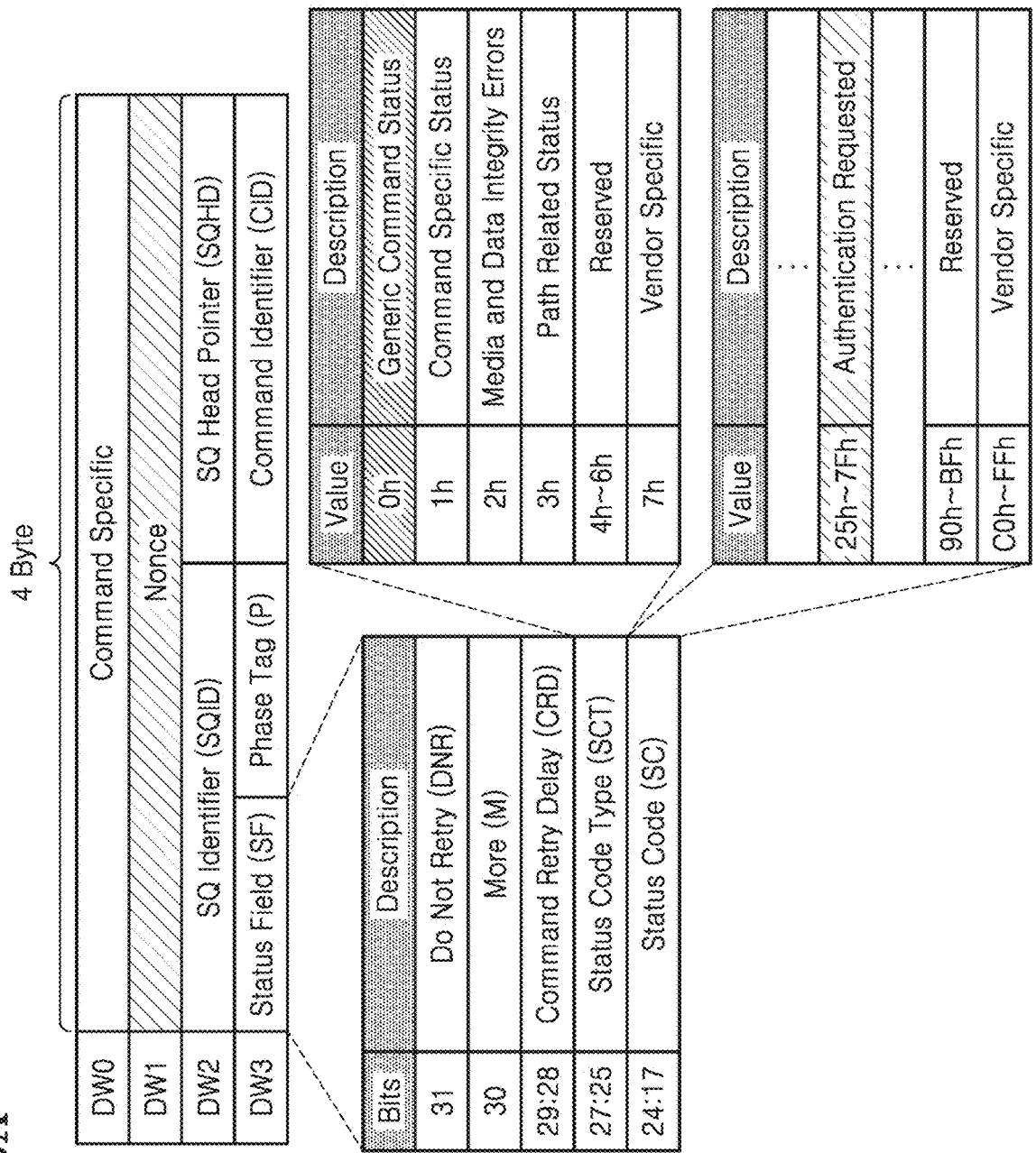
FIGS. 16A to 16C are each a diagram illustrating a completion queue entry for a response signal corresponding to an asynchronous event request command, according to some example embodiments of the inventive concepts.
Figure 16B:
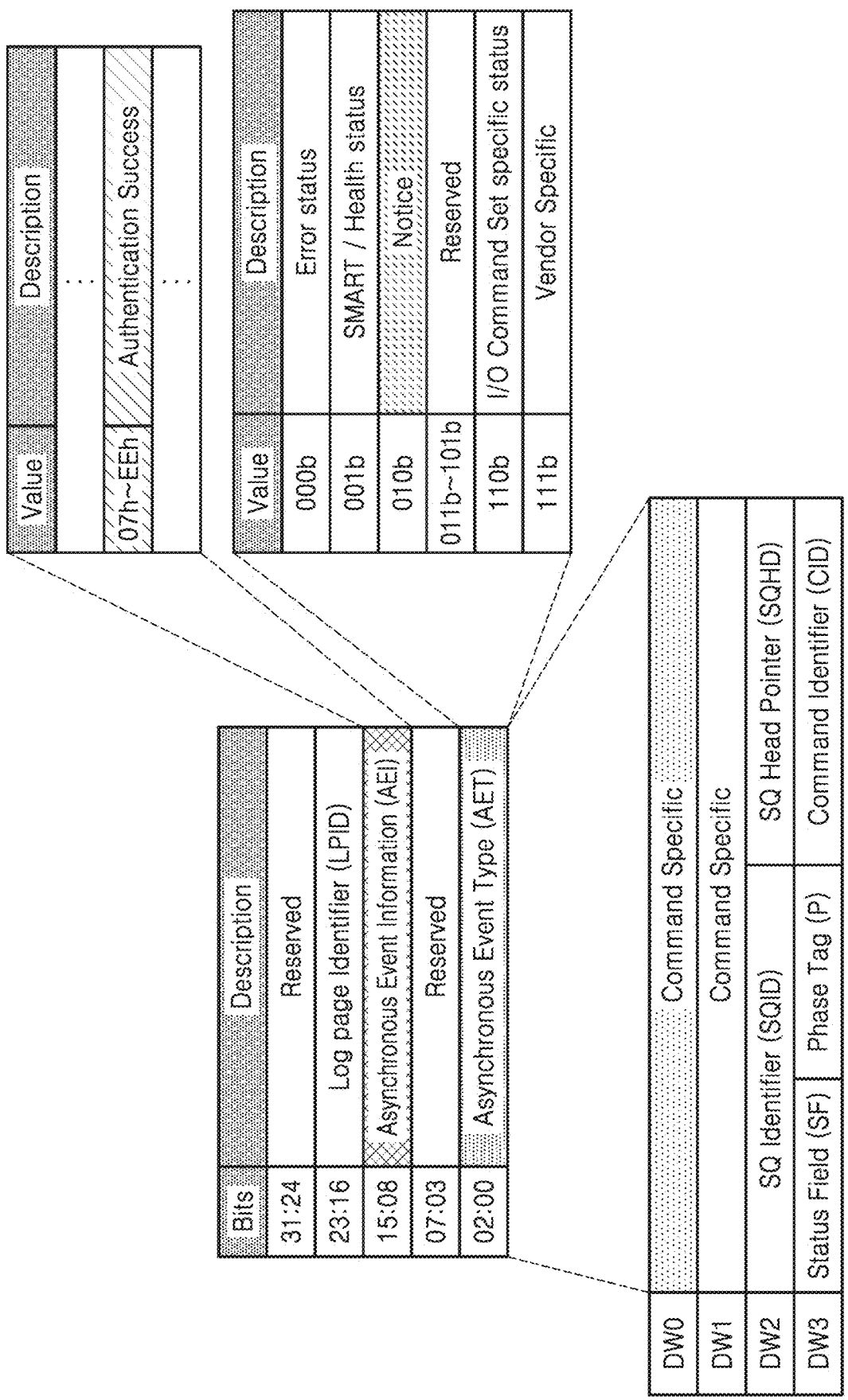
Figure 16C:
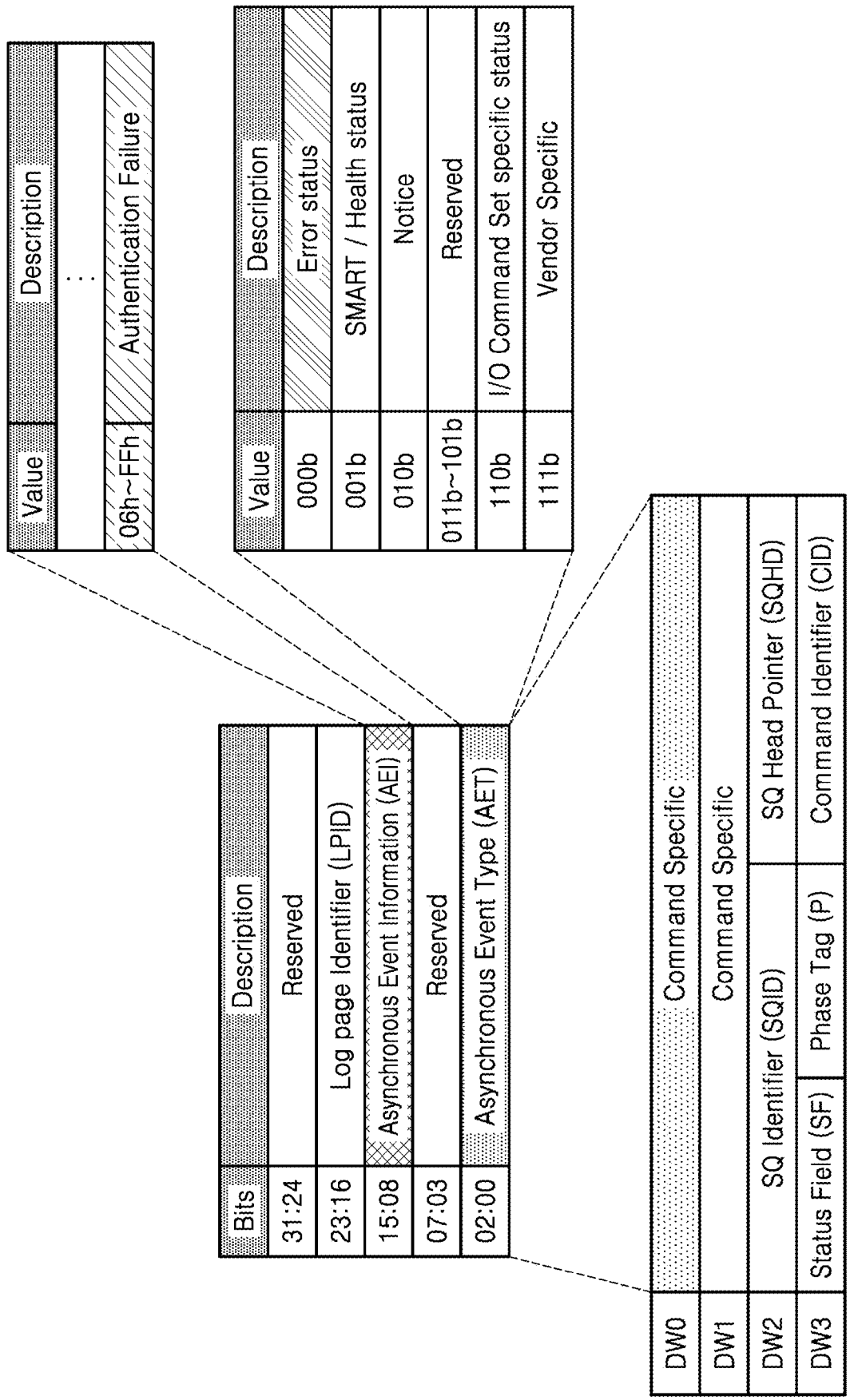

FIGS. 16A to 16C are each a diagram illustrating a completion queue entry for a response signal corresponding to an asynchronous event request command, according to some example embodiments of the inventive concepts.

Referring to FIG. 16A, in some example embodiments, the completion queue entry shown in FIG. 16A may be a completion queue entry for the response signal (RSPNS in FIG. 2) described above with reference to FIG. 2. In some example embodiments, the completion queue entry shown in FIG. 16A may be a completion queue entry for the first event response signal (in operation S2020 of FIG. 8) described above with reference to FIG. 8. The first event response signal (in operation S2020 of FIG. 8) described above with reference to FIG. 8 may correspond to the first asynchronous event request command (in operation S2010 of FIG. 8) described above with reference to FIG. 8.

In the completion queue entry shown in FIG. 16A, the DW0 may include a field that is specifically defined according to the type of command. The DW1 may include a nonce. In this case, the size of the nonce may be 4 bytes. However, the inventive concepts are not limited thereto, and in some example embodiments, when the completion queue entry includes 5 or more double words, the nonce may be included in a double word x (where x is an integer of 4 or more). The DW2 may include the submission queue identifier field SQID and the submission queue head pointer field SQHD.

In some example embodiments, when the value of the Status Code Type field SCT of the status field SF in the DW3 is "0h", the value of the Status Code field SC being one of "25h" to "7Fh" indicates Authentication Requested. Authentication Requested may refer to requesting, by the storage device 100, authentication from the host 200. The value of the Status Code Type field SCT of the status field SF being "0h" and the value of the Status Code field SC being one of "90h" to "BFh" may indicate Reserved. The value of the Status Code Type field SCT of the status field SF being "0h" and the value of the Status Code field SC being one of "C0h" to "FFh" may indicate Vendor Specific.

In some example embodiments, when the value of the Status Code Type field SCT of the status field SF in the DW3 is "0h", the value of the Status Code field SC being one of "25h" to "7Fh" may indicate Reserved. The value of the Status Code Type field SCT of the status field SF being "0h" and the value of the Status Code field SC being one of "90h" to "BFh" may indicate Authentication Requested. The value of the Status Code Type field SCT of the status field SF being "0h" and the value of the Status Code field SC being one of "C0h" to "FFh" may indicate Vendor Specific.

Referring to FIG. 16B, the completion queue entry shown in FIG. 16B may be a completion queue entry for the event response signal (in operation S553 of FIG. 6A) described above with reference to FIG. 6A, the first event response signal (in operation S1540 of FIG. 7) described above with reference to FIG. 7, or the second event response signal (in operation S2540 of FIG. 8) described above with reference to FIG. 8.

In the completion queue entry shown in FIG. 16B, the DW0 may include a log page identifier field LPID, an asynchronous event information field AEI, and/or an asynchronous event type field AET.

The asynchronous event type field AET may have a range from a zeroth-position bit to a second-position bit (02:00). The value of the asynchronous event type field AET being "000b", "001b", "010b", "011b to 101b", "110b", or "111b" indicates that the asynchronous event type is Error status, Self-Monitoring, Analysis and Reporting Technology (SMART)/Health status, Notice, Reserved, Input/Output (I/O) Command Set specific status, or Vendor Specific, respectively.

The asynchronous event information field AEI may have a range from an eighth-position bit to a fifteenth-position bit (15:08). In some example embodiments, the value of the asynchronous event type field AET may be "010b", and the value of the asynchronous event information field AEI may be one of "07h" to "EEh". In this case, the value of the asynchronous event information field AEI being one of "07h" to "EEh" may indicate Authentication Success.

Referring to FIG. 16C, the completion queue entry shown in FIG. 16C may be a completion queue entry for the event response signal (in operation S562 of FIG. 6B) described above with reference to FIG. 6B, the second event response signal (in operation S1630 of FIG. 7) described above with reference to FIG. 7, or the third event response signal (in operation S2630 of FIG. 8) described above with reference to FIG. 8.

In the completion queue entry shown in FIG. 16C, the DW0 may include the log page identifier field LPID, the asynchronous event information field AEI, and the asynchronous event type field AET.

In some example embodiments, the value of the asynchronous event type field AET may be "000b", and/or the value of the asynchronous event information field AEI may be one of "06h" to "FFh". In this case, the value of the asynchronous event information field AEI being one of "06h" to "FFh" may indicate Authentication Failure.

Figure 17:
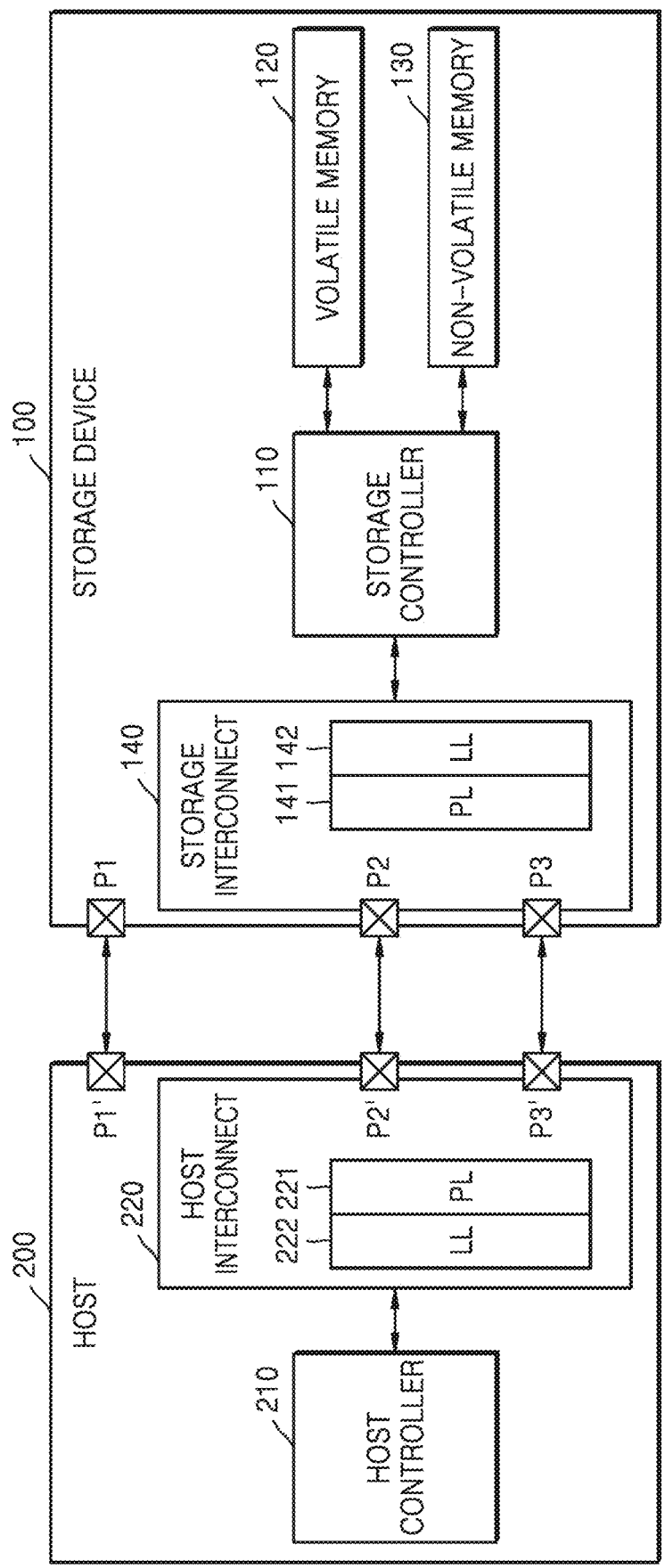
FIG. 17 is a diagram illustrating an interface between a host and a storage controller, according to some example embodiments of the inventive concepts.

FIG. 17 is a diagram illustrating an interface between a host and a storage controller, according to some example embodiments of the inventive concepts.

Referring to FIG. 17, the storage device 100 may be connected to the host 200 according to interface specifications defined in the Universal Flash Storage (UFS) standard. However, the inventive concepts are not limited thereto, and the storage device 100 may be connected to the host 200 according to various standard interfaces.

The host 200 may be a data processing device capable of processing data, such as a CPU, a microprocessor, or an application processor (AP). The host 200 may execute an operating system (OS) and/or various applications. In some example embodiments, the storage system may be included in a mobile device, and the host 200 may be implemented by an AP. In some example embodiments, the host 200 may be implemented by a System-On-a-Chip (SoC) and thus may be embedded in an electronic device.

The storage device 100 may include the storage controller 110, the volatile memory 120, the non-volatile memory 130, and/or a storage interconnect 140. Descriptions of the storage controller 110, the volatile memory 120, and the non-volatile memory 130 are the same as described above with reference to FIG. 1.

Although the storage interconnect 140 may be a separate component from the storage controller 110, the inventive concepts are not limited thereto, and the storage interconnect 140 may be included in the storage controller 110. For example, when the storage controller 110 is implemented as one package chip, the storage interconnect 140 may also be implemented together therewith in the package chip.

The host 200 may include a host controller 210 and a host interconnect 220.

The host 200 may further include a first pin P1' and may transmit data and/or a command to the storage device 100 through the first pin P1'. In addition, the host 200 may receive a response signal through the first pin P1'. The storage device 100 may further include a first pin P1, which is connected to the first pin P1', and may receive data and/or a command from the host 200 through the first pin P1. In addition, the storage device 100 may transmit a response signal through the first pin P1.

The host 200 may further include second and/or third pins P2' and P3', and the storage device 100 may further include second and/or third pins P2 and P3 that are respectively connected to the second and/or third pins P2' and P3'. In some example embodiments, the host 200 may transmit data required, or sufficient, for authentication to the storage device 100 through the second pins P2' and P2. The storage device 100 may transmit a request signal for performing authentication to the host 200 through the third pins P3' and P3.

The host interconnect 220 and the storage interconnect 140 may each provide an interface for exchanging data. In some example embodiments, the storage interconnect 140 may include a physical layer 141 and/or a link layer 142, and the physical layer 141 may be connected to the second and/or third pins P2 and P3. The host interconnect 220 may also include a physical layer 221 and/or a link layer 222, and the physical layer 221 may be connected to the second and/or third pins P2' and P3'. Each, or one or more, physical layer 141 and/or 211 may include physical components for exchanging data between the host 200 and the storage device 100, for example, at least one transmitter, at least one receiver, and/or the like. Each, or one or more, link layer 142 and/or 222 may manage the transmission and/or composition of data and may manage the integrity and/or error of data.

In some example embodiments, when the storage system is a mobile device, the link layers 142 and/or 222 may be defined by "UniPro" specifications, and the physical layers 141 and/or 221 may be defined by "M-PHY" specifications. UniPro and M-PHY are interface specifications proposed by Mobile Industry Processor Interface (MIPI) Alliance. Here, each, or one or more, of the link layers 142 and/or 222 may include a physical adapted layer. The physical adapted layer may control each, or one or more, of the link layers 142 and/or 222, such as managing a symbol of data or managing power.

Figure 18:
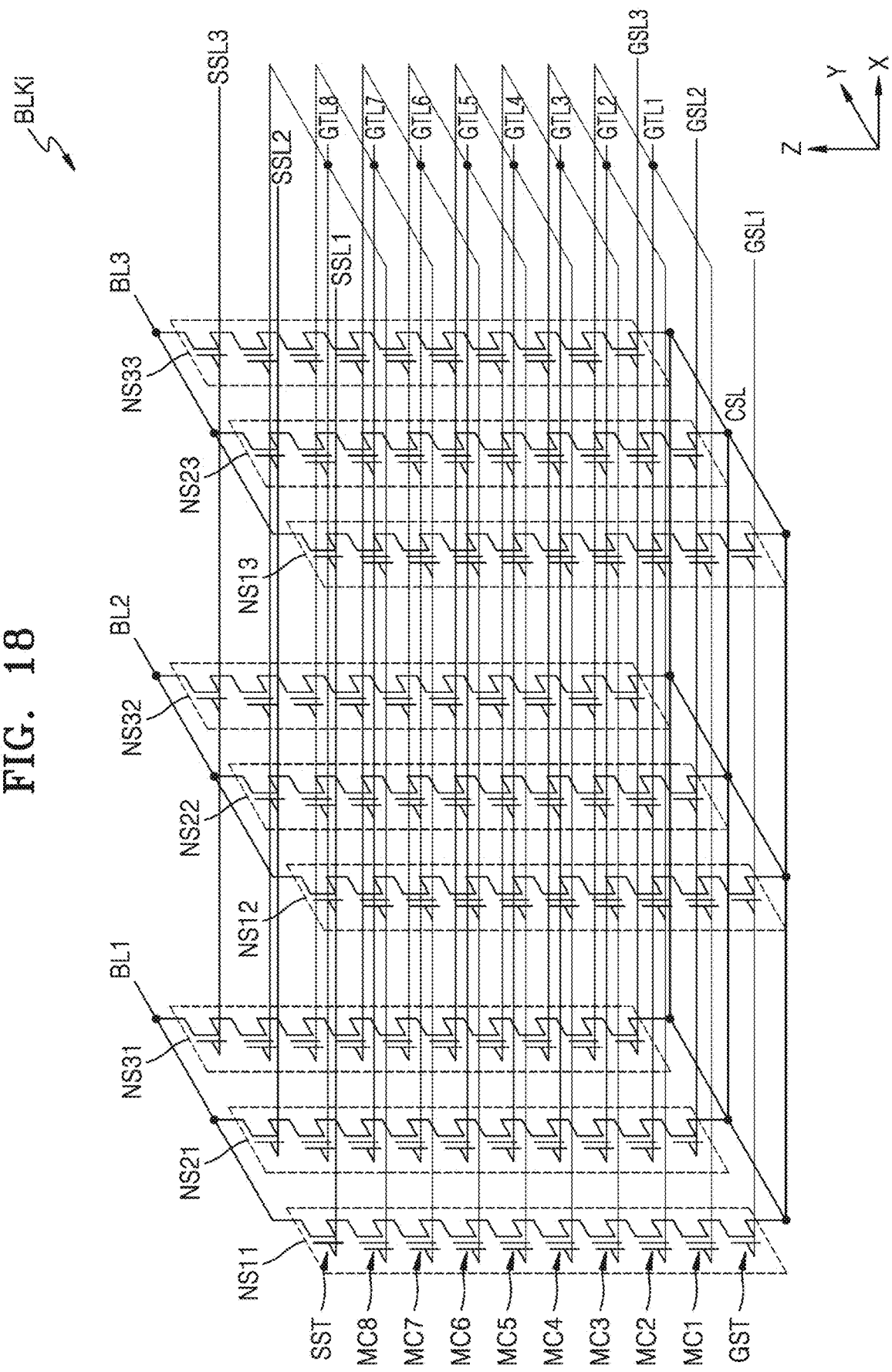
FIG. 18 is a diagram illustrating a 3-dimensional (3D) vertical NAND (VNAND) structure according to some example embodiments of the inventive concepts.

FIG. 18 is a diagram illustrating a 3D vertical NAND (VNAND) structure according to some example embodiments of the inventive concepts.

Referring to FIG. 18, non-volatile memory may be implemented by 3D VNAND-type flash memory. A memory block BLKi represents a 3D memory block formed in a 3D structure on a substrate. For example, a plurality of memory NAND strings included in the memory block BLKi may be formed in a direction that is perpendicular to the substrate.

The memory block BLKi may include a plurality of memory NAND strings NS11 to NS33 connected between bit lines BL1, BL2, and/or BL3 and/or a common source line CSL. Each, or one or more, of the plurality of memory NAND strings NS11 to NS33 may include a string select transistor SST, a plurality of memory cells MC1, MC2, . . . , and/or MC8, and/or a ground select transistor GST.

The string select transistor SST may be connected to a corresponding string select line SSL1, SSL2, and/or SSL3. The plurality of memory cells MC1, MC2, . . . , and/or MC8 may be respectively connected to corresponding gate lines GTL1, GTL2, . . . , and/or GTL8. The gate lines GTL1, GTL2, . . . , and/or GTL8 may correspond to word lines, and some of the gate lines GTL1, GTL2, . . . , and/or GTL8 may correspond to dummy word lines. The ground select transistor GST may be connected to a corresponding ground select line GSL1, GSL2, and/or GSL3. The string select transistor SST may be connected to the corresponding bit line BL1, BL2, and/or BL3, and the ground select transistors GST may be connected to the common source line CSL.

Word lines (for example, WL1) at the same level may be connected to each other in common, and the ground select lines GSL1, GSL2, and/or GSL3 and the string select lines SSL1, SSL2, and/or SSL3 may be separated from each other.

Figure 19:
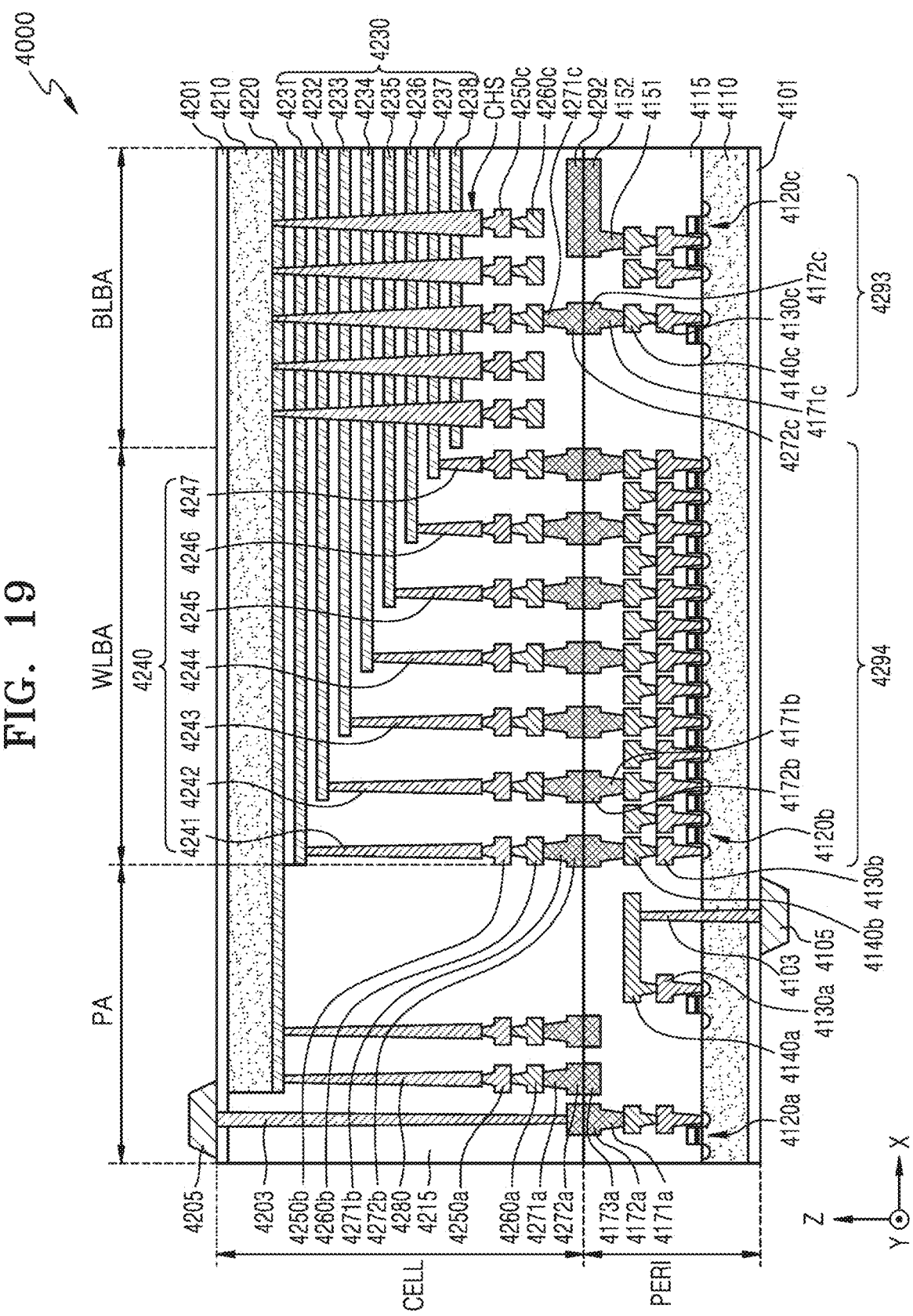
FIG. 19 is a diagram illustrating a bonding vertical NAND (BVNAND) structure according to some example embodiments of the inventive concepts.

FIG. 19 is a diagram illustrating a bonding vertical NAND (BVNAND) structure according to some example embodiments of the inventive concepts.

Referring to FIG. 19, a memory device 4000 may be implemented by BVNAND-type flash memory. The memory device 4000 may have a chip-to-chip (C2C) structure. The C2C structure may mean that an upper chip including a cell region CELL is fabricated on a first wafer, a lower chip including a peripheral circuit region PERI is fabricated on a second wafer that is different from the first wafer, and then, the upper chip is connected to the lower chip by a bonding method. For example, the bonding method may refer to a method of electrically connecting a bonding metal formed in an uppermost metal layer of the upper chip to a bonding metal formed in an uppermost metal layer of the lower chip. For example, when the bonding metal is formed of copper (Cu), the bonding method may be a Cu—Cu bonding method, and the bonding metal may also be formed of aluminum or tungsten.

Each, or one or more, of the peripheral circuit region PERI and/or the cell region CELL of the memory device 4000 may include an external pad bonding area PA, a word line bonding area WLBA, and/or a bit line bonding area BLBA.

The peripheral circuit region PERI may include a first substrate 4110, an interlayer insulating layer 4115, a plurality of circuit elements 4120a, 4120b, and/or 4120c formed on the first substrate 4110, first metal layers 4130a, 4130b, and/or 4130c respectively connected to the plurality of circuit elements 4120a, 4120b, and/or 4120c, and/or second metal layers 4140a, 4140b, and/or 4140c respectively formed on the first metal layers 4130a, 4130b, and/or 4130c. In some example embodiments, the first metal layers 4130a, 4130b, and/or 4130c may be formed of tungsten having relatively high resistivity, and/or the second metal layers 4140a, 4140b, and/or 4140c may be formed of copper having relatively low resistivity.

Herein, although only the first metal layers 4130a, 4130b, and 4130c and the second metal layers 4140a, 4140b, and 4140c are shown and described, the inventive concepts are not limited thereto, and one or more metal layers may be further formed on the second metal layers 4140a, 4140b, and/or 4140c. At least a portion of the one or more metal layers formed on the second metal layers 4140a, 4140b, and/or 4140c may be formed of aluminum and/or the like having higher resistivity than that of copper forming the second metal layers 4140a, 4140b, and/or 4140c.

The interlayer insulating layer 4115 may be disposed on the first substrate 4110 to cover the plurality of circuit elements 4120a, 4120b, and/or 4120c, the first metal layers 4130a, 4130b, and/or 4130c, and/or the second metal layers 4140a, 4140b, and/or 4140c.

Lower bonding metals 4171b and/or 4172b may be formed on the second metal layer 4140b in the word line bonding area WLBA. In the word line bonding area WLBA, the lower bonding metals 4171b and/or 4172b in the peripheral circuit region PERI may be electrically connected, by a bonding method, to upper bonding metals 4271b and/or 4272b in the cell region CELL, and the lower bonding metals 4171b and/or 4172b and/or the upper bonding metals 4271b and/or 4272b may be formed of aluminum, copper, tungsten, and/or the like.

The cell region CELL may provide at least one memory block. The cell region CELL may include a second substrate 4210 and/or a common source line 4220. On the second substrate 4210, a plurality of word lines 4231 to 4238 (that is, 4230) may be stacked in a direction (Z-axis direction) that is perpendicular to an upper surface of the second substrate 4210. String select lines and/or a ground select line may be arranged on and/or below the plurality of word lines 4230, respectively, and the plurality of word lines 4230 may be arranged between the string select lines and the ground select line.

In the bit line bonding area BLBA, a channel structure CHS may extend in the direction that is perpendicular to the upper surface of the second substrate 4210, and pass through the plurality of word lines 4230, the string select lines, and the ground select line. The channel structure CHS may include a data storage layer, a channel layer, a buried insulating layer, and/or the like, and the channel layer may be electrically connected to a first metal layer 4250c and/or a second metal layer 4260c. For example, the first metal layer 4250c may be a bit line contact, and/or the second metal layer 4260c may be a bit line. In some example embodiments, the second metal layer, that is, the bit line 4260c may extend in a first direction (Y-axis direction) that is parallel to the upper surface of the second substrate 4210.

An area in which the channel structure CHS, the bit line 4260c, and/or the like are arranged may be defined as the bit line bonding area BLBA. In the bit line bonding area BLBA, the bit line 4260c may be electrically connected to the circuit elements 4120c providing a page buffer 4293 in the peripheral circuit region PERI. For example, the bit line 4260c may be connected to upper bonding metals 4271c and/or 4272c in the peripheral circuit region PERI, and the upper bonding metals 4271c and/or 4272c may be connected to lower bonding metals 4171c and/or 4172c connected to the circuit elements 4120c of the page buffer 4293.

In the word line bonding area WLBA, the plurality of word lines 4230 may extend in a second direction (X-axis direction) that is parallel to the upper surface of the second substrate 4210, and may be connected to a plurality of cell contact plugs 4241 to 4247 (that is, 4240). The plurality of word lines 4230 and the plurality of cell contact plugs 4240 may be connected to each other in pads provided by at least a portion of the plurality of word lines 4230 extending in different lengths in the second direction. A first metal layer 4250b and/or a second metal layer 4260b may be connected, in the stated order, to an upper portion of the plurality of cell contact plugs 4240 connected to the plurality of word lines 4230. The plurality of cell contact plugs 4240 may be connected to the peripheral circuit region PERI by the upper bonding metals 4271b and/or 4272b of the cell region CELL and/or the lower bonding metals 4171b and/or 4172b of the peripheral circuit region PERI in the word line bonding area WLBA.

The plurality of cell contact plugs 4240 may be electrically connected to the circuit elements 4120b providing a row decoder 4294 in the peripheral circuit region PERI. In some example embodiments, operating voltages of the circuit elements 4120b providing the row decoder 4294 may be different from operating voltages of the circuit elements 4120c providing the page buffer 4293. For example, the operating voltages of the circuit elements 4120c providing the page buffer 4293 may be greater than the operating voltages of the circuit elements 4120b providing the row decoder 4294.

A common source line contact plug 4280 may be arranged in the external pad bonding area PA. The common source line contact plug 4280 may be formed of a conductive material such as a metal, a metal compound, polysilicon, and/or the like, and may be electrically connected to the common source line 4220. An upper bonding metal 4271a, a first metal layer 4250a and/or a second metal layer 4260a may be stacked on an upper portion of the common source line contact plug 4280, in the stated order. For example, an area in which the common source line contact plug 4280, the first metal layer 4250a, and/or the second metal layer 4260a are arranged may be defined as the external pad bonding area PA.

First and/or second input-output pads 4105 and 4205 may be arranged in the external pad bonding area PA. A lower insulating film 4101 covering a lower surface of the first substrate 4110 may be formed below the first substrate 4110, and the first input-output pad 4105 may be formed on the lower insulating film 4101. The first input-output pad 4105 may be connected to at least one of the plurality of circuit elements 4120a, 4120b, and/or 4120c arranged in the peripheral circuit region PERI through a first input-output contact plug 4103, and may be separated from the first substrate 4110 by the lower insulating film 4101. In addition, a side insulating film may be arranged between the first input-output contact plug 4103 and the first substrate 4110 to electrically separate the first input-output contact plug 4103 from the first substrate 4110.

An upper insulating film 4201 covering the upper surface of the second substrate 4210 may be formed on the second substrate 4210, and the second input-output pad 4205 may be arranged on the upper insulating film 4201. The second input-output pad 4205 may be connected to at least one of the plurality of circuit elements 4120a, 4120b, and/or 4120c arranged in the peripheral circuit region PERI through a second input-output contact plug 4203.

According to some example embodiments, the second substrate 4210 and/or the common source line 4220 may not be arranged in an area in which the second input-output contact plug 4203 is arranged. In addition, the second input-output pad 4205 may not overlap the word lines 4230 in the third direction (Z-axis direction). The second input-output contact plug 4203 may be separated from the second substrate 4210 in a direction that is parallel to the upper surface of the second substrate 4210, and may pass through an interlayer insulating layer 4215 of the cell region CELL to be connected to the second input-output pad 4205.

According to some example embodiments, the first input-output pad 4105 and/or the second input-output pad 4205 may be selectively formed. For example, the memory device 4000 may include only the first input-output pad 4105 arranged on the first substrate 4110 or only the second input-output pad 4205 arranged on the second substrate 4210. Alternatively, the memory device 4000 may include both the first input-output pad 4105 and the second input-output pad 4205.

A metal pattern of an uppermost metal layer may be provided as a dummy pattern or the uppermost metal layer may be absent, in each, or one or more, of the external pad bonding area PA and the bit line bonding area BLBA, respectively included in the cell region CELL and the peripheral circuit region PERI.

In the external pad bonding area PA, the memory device 4000 may include a lower metal pattern 4173a formed in an uppermost metal layer of the peripheral circuit region PERI in correspondence with an upper metal pattern 4272a formed in an uppermost metal layer of the cell region CELL, the lower metal pattern 4173a having the same shape as the upper metal pattern 4272a of the cell region CELL. The lower metal pattern 4173a formed in the uppermost metal layer of the peripheral circuit region PERI may not be connected to a separate contact in the peripheral circuit region PERI. Similarly, in the external pad bonding area PA, an upper metal pattern, which has the same shape as a lower metal pattern of the peripheral circuit region PERI, may be formed in an upper metal layer of the cell region CELL in correspondence with the lower metal pattern formed in an uppermost metal layer of the peripheral circuit region PERI.

The lower bonding metals 4171b and/or 4172b may be formed on the second metal layer 4140b in the word line bonding area WLBA. In the word line bonding area WLBA, the lower bonding metals 4171b and/or 4172b of the peripheral circuit region PERI may be electrically connected to the upper bonding metals 4271b and/or 4272b of the cell region CELL by a bonding method.

In addition, in the bit line bonding area BLBA, an upper metal pattern 4292 may be formed in the uppermost metal layer of the cell region CELL in correspondence with a lower metal pattern 4152 formed in the uppermost metal layer of the peripheral circuit region PERI, the upper metal pattern 4292 having the same shape as the lower metal pattern 4152 of the peripheral circuit region PERI. A contact may not be formed on the upper metal pattern 4292 formed in the uppermost metal layer of the cell region CELL.

One or more of the elements disclosed above may include or be implemented in one or more processing circuitries such as hardware including logic circuits; a hardware/software combination such as a processor executing software; or a combination thereof. For example, the processing circuitries more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc.

While the inventive concepts have been particularly shown and described with reference to some example embodiments thereof, it will be understood that various changes in form and details may be made therein without departing from the spirit and scope of the following claims.

What is claimed is:

1. A storage device capable of communicating with a host, the storage device comprising:
   a first memory storing command list data that indicates list information for at least one administration command, the at least one administration command directing to control an operation of the storage device; and
   a storage controller configured to:
      receive a first command from the host;
      check whether the first command corresponds to an administration command of the list information, based on the command list data; and
      transmit, to the host, a first response signal for requesting authentication according to a check result.

2. The storage device of claim 1, further comprising a second memory temporarily storing a command,
   wherein the storage controller is further configured to, in response to the first command corresponding to the administration command, provide data, a first write command, and a first address to the second memory, the data indicating the first command.

3. The storage device of claim 2, further comprising a third memory storing host characteristic data that indicates characteristics of the host,
   wherein the storage controller is further configured to:
      after the data is stored in the second memory, perform a first authentication operation on the host;
      perform an operation directed by the first command in response to the host being authenticated as a result of the first authentication operation; and
      provide the host characteristic data, a second write command, and a second address to the third memory.

4. The storage device of claim 1, wherein the storage controller is further configured to:
   after the first response signal is transmitted to the host, receive, from the host, hash data indicating a hash value of a certificate; and
   perform a first authentication operation on the host, according to whether a reference hash value of pre-stored reference hash data is consistent with the hash value.

5. The storage device of claim 4, wherein the storage controller is further configured to:
   perform the first authentication operation in response to the reference hash value being consistent with the hash value; and
   in response to the reference hash value being different from the hash value, perform an operation of identifying an authentication capability of the host, perform a second authentication operation on the certificate, and perform the first authentication operation.

6. The storage device of claim 5, wherein the storage controller is further configured to:

transmit, to the host, a request signal for requesting authentication capability data and algorithm data in response to the reference hash value being different from the hash value;
identify an authentication protocol that is to be used in the first authentication operation, based on the authentication capability data transmitted from the host; and
identify a cryptographic algorithm that is to be used in the first authentication operation, based on the algorithm data transmitted from the host.

7. The storage device of claim 5, wherein the storage controller is further configured to:
receive, from the host, authentication data indicating information signed by a key value included in the certificate;
perform the first authentication operation, based on the authentication data;
perform an operation directed by the first command in response to the host being authenticated as a result of the first authentication operation; and
transmit, to the host, a second response signal for interrupting the host in response to the authentication failing as a result of the first authentication operation.

8. The storage device of claim 1, wherein the first command corresponds to the administration command, and the storage controller is further configured to:
receive, together with the first command, authentication data indicating information signed by a key value included in a certificate of the host;
perform a first authentication operation on the host, based on the authentication data;
transmit, to the host, a second response signal indicating whether an operation corresponding to the first command is completed in response to the host being authenticated as a result of the first authentication operation; and
transmit, to the host, a third response signal for interrupting the host in response to the authentication failing as a result of the first authentication operation.

9. The storage device of claim 1, further comprising a second memory storing first identifier data indicating an identifier of the host,
wherein the storage controller is further configured to:
receive a second command and second identifier data, the second command directing to deactivate an operation that corresponds to the first command;
determine an identity of the host, based on the first identifier data and the second identifier data;
in response to the identity of the host being admitted, deactivate the operation corresponding to the first command in response to the second command and transmit a second response signal corresponding to the second command to the host; and
in response to the identity of the host being denied, transmit, to the host, a third response signal for interrupting the host.

10. The storage device of claim 1, wherein the administration command is a non-volatile memory express (NVMe) admin command as defined in NVMe specifications.

11. A storage device having a first channel and a second channel, the storage device comprising:
a first memory storing command list data that includes information indicating an administration command, the administration command directing to control an operation of the storage device; and
a storage controller configured to:
receive the administration command from a host through the first channel;
transmit a response signal to the host through the first channel; and
transmit and receive an authentication signal for authenticating the host through the second channel.

12. The storage device of claim 11, wherein the storage controller is further configured to:
receive authentication data, together with the administration command, through the second channel;
receive an asynchronous event request command through the first channel; and
in response to an authentication operation on the host being completed through the second channel, transmit a first response signal with respect to the administration command and a second response signal with respect to the asynchronous event request command through the first channel,
wherein the authentication data comprises information signed by a key value included in a certificate of the host,
wherein the first response signal comprises information indicating whether an operation directed by the administration command is completed, and
wherein the second response signal comprises information indicating whether an authentication operation on the host is successful.

13. The storage device of claim 11, wherein the storage controller is further configured to:
through the first channel, receive a first asynchronous event request command and transmit a first response signal;
receive authentication data through the second channel;
receive a second asynchronous event request command from the host through the first channel; and
in response to an authentication operation on the host being completed through the second channel, transmit, to the host, a second response signal with respect to the second asynchronous event request command and a third response signal with respect to the administration command,
wherein the first response signal comprises information indicating to request authentication for the host and information indicating a first nonce,
wherein the authentication data comprises information signed by a key value included in a certificate of the host, and information indicating a second nonce that corresponds to the first nonce,
wherein the second response signal comprises information indicating whether the authentication operation on the host is successful, and
wherein the third response signal comprises information indicating whether an operation directed by the administration command is completed.

14. The storage device of claim 11, wherein the storage controller is further configured to:
transmit a first response signal with respect to the administration command to the host through the first channel;
after the first response signal is transmitted, receive an asynchronous event request command through the first channel and receive authentication data through the second channel; and
in response to an authentication operation on the host being completed through the second channel, transmit a second response signal with respect to the asynchronous event request command to the host, wherein the first response signal comprises information indicating to request authentication for the host and information indicating a first nonce, wherein the authentication data comprises information signed by a key value included in a certificate of the host, and information indicating a second nonce that corresponds to the first nonce, and wherein the second response signal comprises information indicating whether the authentication operation on the host is successful.

15. The storage device of claim 11, further comprising a second memory storing first hash data indicating a first hash value of a certificate, wherein the storage controller is further configured to:
receive second hash data indicating a second hash value that is different from the first hash value, through the second channel;
transmit a first authentication request signal for requesting authentication capability data that indicates authentication protocol information, through the second channel; and
transmit a second authentication request signal for requesting algorithm data that indicates cryptographic algorithm information, through the second channel.

16. The storage device of claim 11, wherein the storage controller is further configured to:
transmit a first response signal indicating that an operation directed by the administration command is completed, through the first channel;
after the first response signal is transmitted, receive an inactive administration command for the administration command through the first channel and receive identifier data indicating an identifier of the host through the second channel; and
transmit a second response signal indicating that an operation directed by the inactive administration command is completed, through the first channel.

17. The storage device of claim 11, wherein the first channel is an in-band channel, and
the second channel is an out-of-band channel.

18. The storage device of claim 11, wherein the administration command is
a lockdown command or a sanitize command.

19. A method of operating a storage device capable of communicating with a host, the method comprising:
receiving a command from the host;
transmitting, to the host, a response signal for requesting authentication for the host, according to whether the command corresponds to at least one command included in a command list of administration command directing to control an operation of the storage device;
performing an authentication operation, based on authentication data transmitted from the host; and
performing an operation corresponding to the command, according to a result of the authentication operation.

20. The method of claim 19, wherein the transmitting the response signal to the host comprises transmitting the response signal in response to the command corresponding to the at least one command, and
the performing the authentication operation comprises pending an operation corresponding to the command until the authentication operation is performed.

21. The method of claim 19, further comprising storing authentication result data indicating a result of the authentication operation.

* * * * *